United States Patent
Sajedi

(10) Patent No.: US 11,566,880 B2
(45) Date of Patent: Jan. 31, 2023

(54) ULTRA-LIGHT AND ULTRA-ACCURATE PORTABLE COORDINATE MEASUREMENT MACHINE SUBSTANTIALLY IMMUNE TO BEARING ASSEMBLY THERMAL EFFECTS

(71) Applicant: SA08700334, Grand Cayman (KY)

(72) Inventor: Allen Sajedi, Orlando, FL (US)

(73) Assignee: SA08700334, Grand Cayman (KY)

( * ) Notice: Subject to any disclaimer, the term of this patent is extended or adjusted under 35 U.S.C. 154(b) by 177 days.

(21) Appl. No.: 17/134,000

(22) Filed: Dec. 24, 2020

(65) Prior Publication Data

US 2021/0116227 A1    Apr. 22, 2021

Related U.S. Application Data

(63) Continuation-in-part of application No. 16/394,685, filed on Apr. 25, 2019, now Pat. No. 11,092,419, which is a continuation of application No. 16/374,895, filed on Apr. 4, 2019, now Pat. No. 11,054,237, and a continuation-in-part of application No. 16/362,647, filed on Mar. 23, 2019, now Pat. No. 10,641,592, which is a continuation of application No. 15/730,517, filed on Oct. 11, 2017, now Pat. No.
(Continued)

(51) Int. Cl.
*G01B 5/008* (2006.01)

(52) U.S. Cl.
CPC .................. *G01B 5/008* (2013.01)

(58) Field of Classification Search
None
See application file for complete search history.

(56) References Cited

U.S. PATENT DOCUMENTS

| 4,888,877 A | 12/1989 | Enderle et al. |
| 5,408,754 A | 4/1995 | Raab |

(Continued)

FOREIGN PATENT DOCUMENTS

WO    2018/191632    10/2018

OTHER PUBLICATIONS

P.A. Orton et al., Automatic Self-Calibration of an Incremental Motion Encoder, IEEE Instrument and Measurement Technology Conference, Budapest, Hungary, May 21-23, 2001, at 1614.
(Continued)

*Primary Examiner* — Christopher W Fulton
(74) *Attorney, Agent, or Firm* — Renner, Otto, Boisselle & Sklar, LLP

(57) ABSTRACT

A coordinate measurement machine (CMM) includes a manually-positionable articulated arm. The articulated arm includes arm segments and rotary joints. At least one of the rotary joints includes a bearing assembly that comprises first and second bearings, a shaft that engages an inner race of the first bearing and an inner race of the second bearing, a housing that engages an outer race of the first bearing and an outer race of the second bearing, and a transducer configured to output an angle signal corresponding to an angle of rotation of the shaft relative to the housing. The shaft and the housing may be fabricated from materials having coefficients of thermal expansion selected to minimize change in moment rigidity and/or radial rigidity of the bearing assembly as the ambient temperature changes from the lower limit to the upper limit of the CMM operating ambient temperature range.

20 Claims, 15 Drawing Sheets

Related U.S. Application Data 10,267,614, which is a continuation-in-part of application No. 15/486,427, filed on Apr. 13, 2017, now Pat. No. 9,803,973.

(56) References Cited

U.S. PATENT DOCUMENTS

| | | | |
|---|---|---|---|
| 5,596,189 A | 1/1997 | Orton | |
| 5,611,147 A | 3/1997 | Raab | |
| 5,829,148 A | 11/1998 | Eaton | |
| 5,890,300 A * | 4/1999 | Brenner | G01B 5/012 33/704 |
| 6,170,358 B1 | 1/2001 | Hunter et al. | |
| 6,219,928 B1 | 4/2001 | Raab et al. | |
| 6,366,831 B1 * | 4/2002 | Raab | G05B 19/4207 700/262 |
| 6,374,198 B1 | 4/2002 | Schifa et al. | |
| 6,519,860 B1 | 2/2003 | Bieg et al. | |
| 6,892,465 B2 | 5/2005 | Raab et al. | |
| 6,920,697 B2 | 7/2005 | Raab et al. | |
| 6,935,036 B2 | 8/2005 | Raab et al. | |
| 6,957,496 B2 | 10/2005 | Raab et al. | |
| 6,965,843 B2 | 11/2005 | Raab et al. | |
| 6,988,322 B2 | 1/2006 | Raab et al. | |
| 7,050,930 B2 | 5/2006 | Raab et al. | |
| 7,051,450 B2 | 5/2006 | Raab et al. | |
| 7,069,664 B2 | 7/2006 | Raab et al. | |
| 7,073,271 B2 | 7/2006 | Raab et al. | |
| 7,246,030 B2 | 7/2007 | Raab et al. | |
| 7,269,910 B2 | 9/2007 | Raab et al. | |
| 7,430,068 B2 | 9/2008 | Becker et al. | |
| 7,519,493 B2 | 4/2009 | Atwell et al. | |
| 7,624,510 B2 | 12/2009 | Ferrari | |
| 7,733,544 B2 | 6/2010 | Becker et al. | |
| 7,735,234 B2 | 6/2010 | Briggs et al. | |
| 7,743,524 B2 | 6/2010 | Eaton et al. | |
| 7,774,949 B2 | 8/2010 | Ferrari | |
| RE42,055 E | 1/2011 | Raab et al. | |
| 7,881,896 B2 | 2/2011 | Atwell et al. | |
| 8,015,721 B2 | 9/2011 | Eaton et al. | |
| 8,122,610 B2 | 2/2012 | Tait et al. | |
| 8,145,446 B2 | 3/2012 | Atwell et al. | |
| 8,336,220 B2 | 12/2012 | Eaton et al. | |
| 8,402,669 B2 | 3/2013 | Ferrari et al. | |
| 8,595,948 B2 | 12/2013 | Raab et al. | |
| 8,699,007 B2 | 4/2014 | Raab et al. | |
| 8,719,474 B2 | 5/2014 | Becker et al. | |
| 8,931,182 B2 | 1/2015 | Raab et al. | |
| 8,997,362 B2 | 4/2015 | Briggs et al. | |
| 9,168,654 B2 * | 10/2015 | Briggs | B25J 9/0012 |
| 9,234,773 B2 | 1/2016 | Cramer | |
| 9,410,787 B2 | 8/2016 | Raab et al. | |
| 9,423,282 B2 | 8/2016 | Moy | |
| 9,513,100 B2 | 12/2016 | Raab et al. | |
| 9,803,973 B1 | 10/2017 | Sajedi | |
| 10,215,548 B2 | 2/2019 | Sajedi | |
| 10,228,228 B2 | 3/2019 | Sajedi | |
| 10,267,614 B2 * | 4/2019 | Sajedi | G01B 1/00 |
| 10,274,298 B2 * | 4/2019 | Sajedi | G01B 5/0014 |
| 10,634,478 B2 * | 4/2020 | Sajedi | G01B 5/0004 |
| 10,641,592 B2 * | 5/2020 | Sajedi | G01B 5/0016 |
| 11,054,237 B2 * | 7/2021 | Sajedi | G01B 5/008 |
| 11,092,419 B2 * | 8/2021 | Sajedi | G01B 5/008 |
| 2003/0167647 A1 | 9/2003 | Raab et al. | |
| 2011/0083334 A1 * | 4/2011 | Eley | G01B 5/0002 33/503 |
| 2011/0173825 A1 | 7/2011 | Danielson et al. | |
| 2015/0219452 A1 | 8/2015 | Bridges et al. | |
| 2016/0084633 A1 | 3/2016 | Ferrari et al. | |
| 2018/0216923 A1 | 8/2018 | Creachbaum et al. | |
| 2019/0249974 A1 | 8/2019 | Sajedi | |

OTHER PUBLICATIONS

Zhao, Huining & Yu, Lian-Dong & Jia, Hua-Kun & Li, Weishi & Sun, Jing-Qi. (2016), A New Kinematic Model of Portable Articulated Coordinate Measuring Machine, Applied Sciences, 6, 181, 10.3390/app6070181.

* cited by examiner

ULTRA-LIGHT AND ULTRA-ACCURATE PORTABLE COORDINATE MEASUREMENT MACHINE SUBSTANTIALLY IMMUNE TO BEARING ASSEMBLY THERMAL EFFECTS

BACKGROUND

The present disclosure relates generally to a coordinate measuring machine and more particularly to a high accuracy, ultra-lightweight portable coordinate measuring machine.

Coordinate measurement machines serve to, among other things, measure points in a three-dimensional space. Coordinate measuring machines trace the measuring points in Cartesian coordinate space (x, y, z), for example. Coordinate measuring machines typically consist of a stand and a tracing system. The stand may serve as a reference point relative to which the tracing system moves in the space in a measurable manner. The tracing system for a portable coordinate measuring machine may include an articulated arm attached to the stand at one end and a measurement probe at the other end.

For the measurement to be useful, it must be accurate. Very high accuracy, however, is difficult to achieve because of factors such as temperature and load conditions. For example, changes in the bearing assembly caused by thermal changes have a negative effect on the measurement's accuracy.

Accuracy improvements may be available. Conventionally, however, such improvements came accompanied by significant increases in mass and/or weight of the coordinate measuring machine. Conventional portable coordinate measuring machines of improved accuracy were bulky and heavy. These are undesirable characteristics for coordinate measuring machines, particularly portable coordinate measuring machines. Moreover, processes for constructing and assembling coordinate measuring machines' joints, particularly long joints, with the required precision to obtain accurate measurements have not been available.

SUMMARY OF THE INVENTION

The present disclosure provides a portable coordinate measurement machine (CMM) that is more accurate than prior art coordinate measuring machines. Remarkably, the CMM disclosed herein is also lighter and less bulky.

In an aspect of the invention, the CMM disclosed herein includes novel combinations of materials used to fabricate housings and shafts of the bearing assembly. The materials used may be relatively light. Importantly, the materials used may be combined to counter thermal effects on the bearing assembly. The shaft and the housing may be fabricated from materials having coefficients of thermal expansion selected to minimize change in moment rigidity and/or radial rigidity of the bearing assembly as the ambient temperature changes from the lower limit to the upper limit of the CMM operating ambient temperature range. This result may be achieved passively, i.e., without relying on prior art solutions such as active preload adjustment or heating of the bearing assembly components at low ambient temperatures.

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1A:
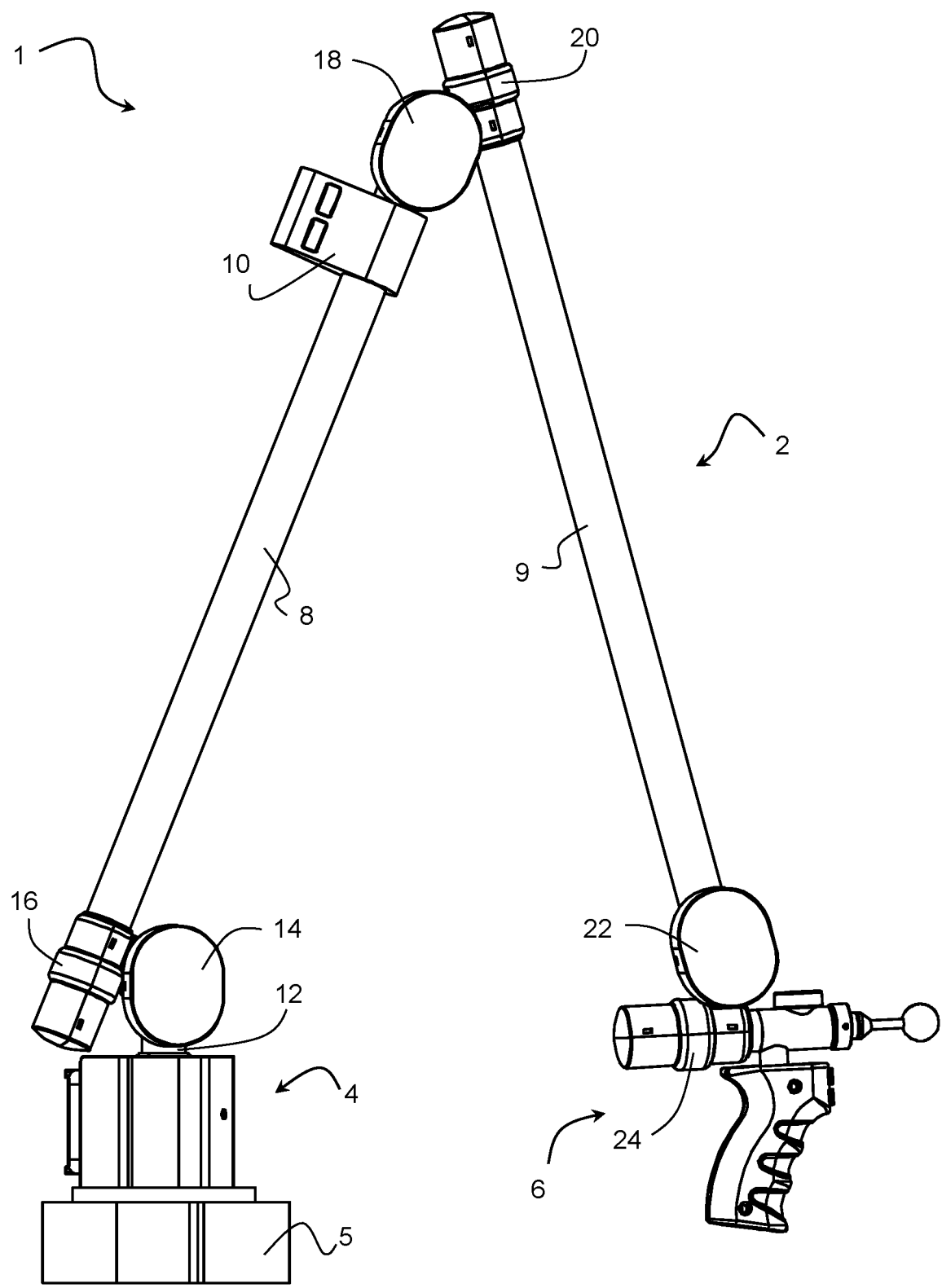
FIGS. 1A-1C illustrate perspective views of an exemplary coordinate measuring machine (CMM).
Figure 1B:
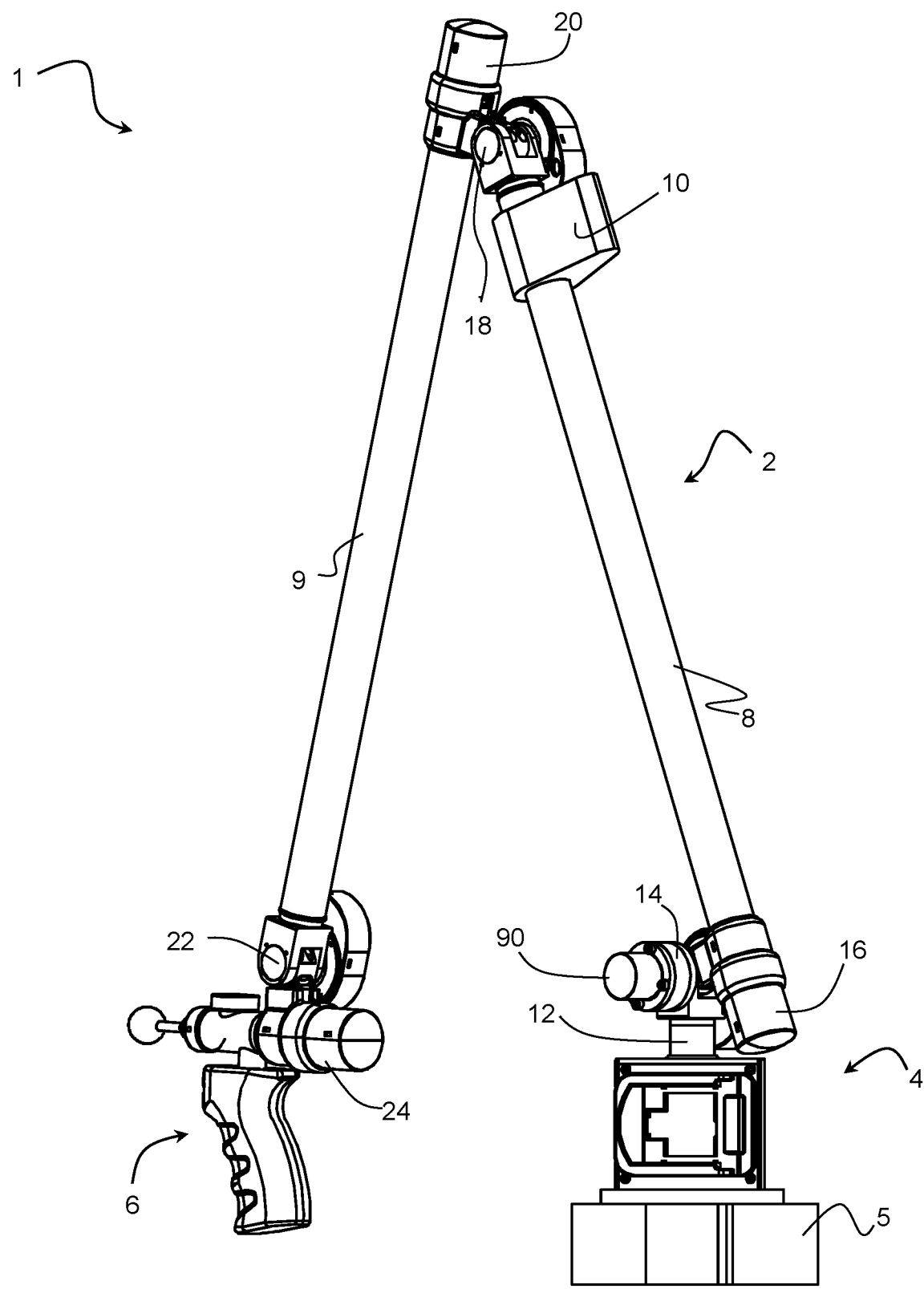
Figure 1C:
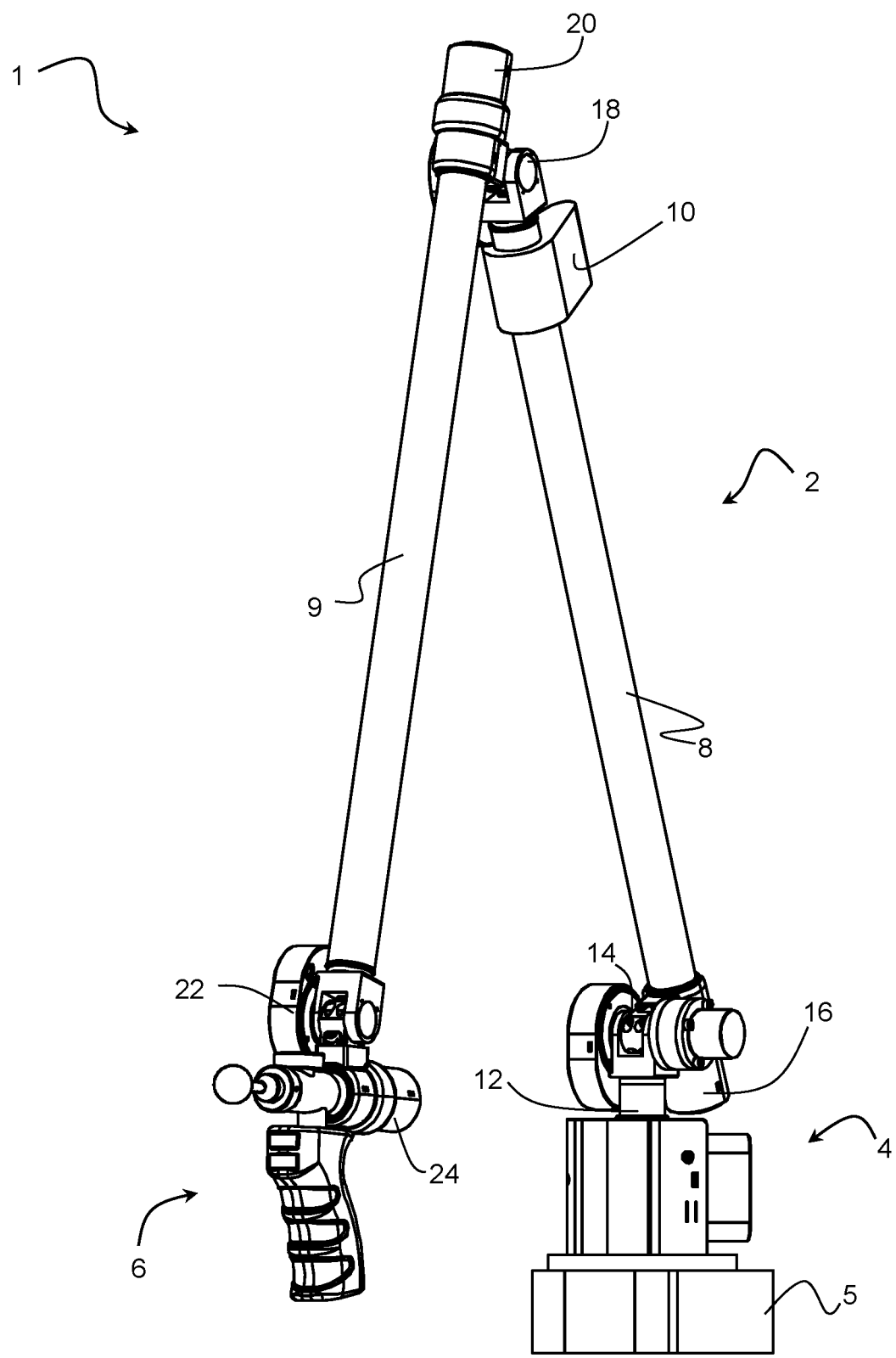
Figure 1D:
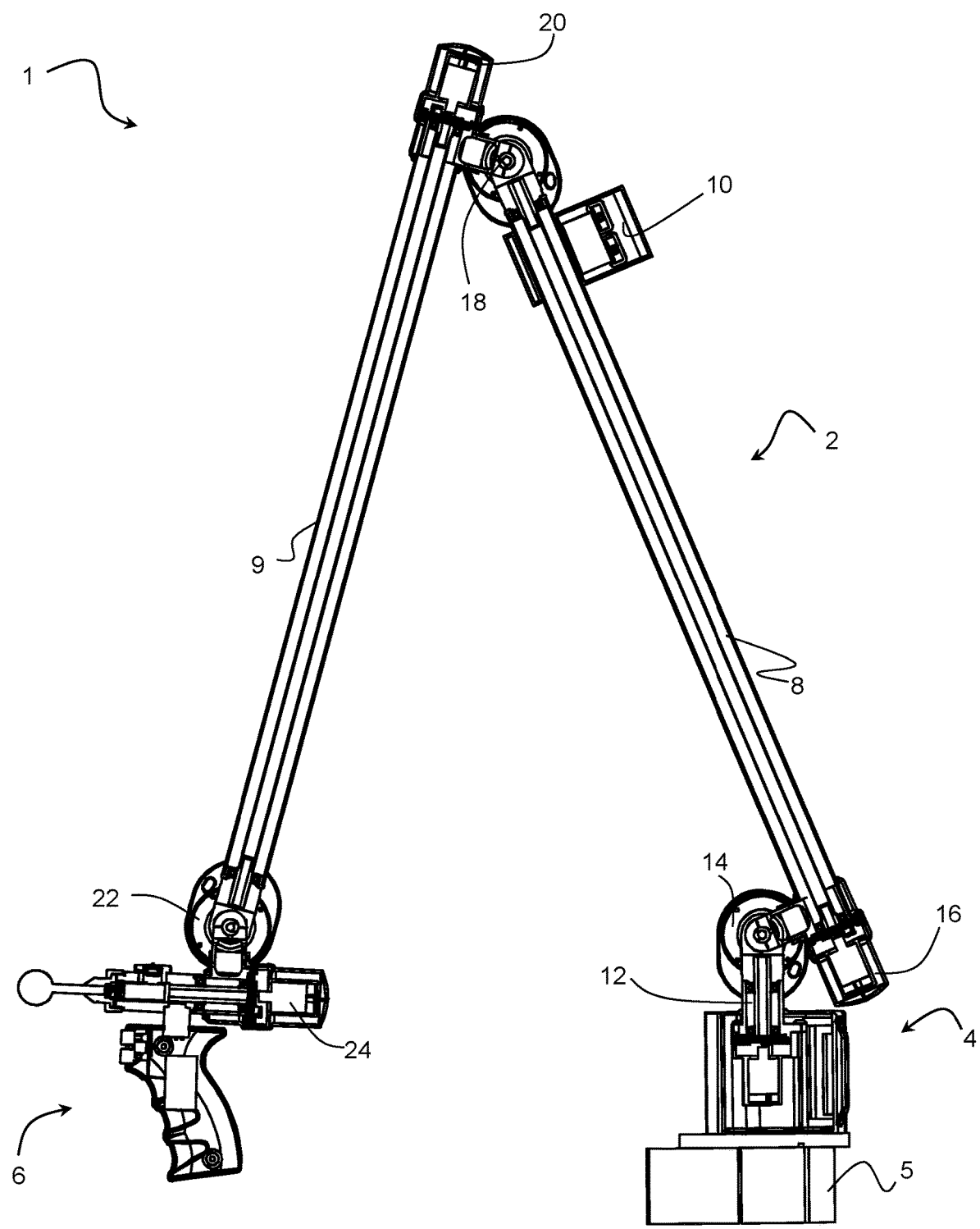
FIG. 1D illustrates a cross-sectional view of the exemplary CMM of FIGS. 1A-1C.

FIGS. 1A-1C illustrate perspective views of an exemplary coordinate measuring machine (CMM) 1. FIG. 1D illustrates a cross-sectional view of the exemplary CMM 1. CMM 1 includes an articulated arm 2, a base 4, and a measurement probe 6. The articulated arm 2 is attached at one end to the base 4 and at the other end to the measurement probe 6. The base 4 may be attached to, for example, a magnetic holder 5 to attach the arm 2 to, for example, a working surface. Articulated arm 2 includes two arm segments 8, 9 and a number of rotary joints 12, 14, 16, 18, 20, 22, 24. The CMM 1 may also include an on-arm switch assembly 10.

The overall length of articulated arm 2 and/or the arm segments 8, 9 may vary depending on its intended application. In one embodiment, the articulated arm may have an overall length of about 48 inches. This arm dimension provides a portable CMM which is well suited for measurements now accomplished using typical hand tools such as micrometers, height gages, calipers, and the like. Articulated arm 2 could have smaller or larger dimensions.

The rotary joints generally include two types of joints, swivel joints 12, 16, 20, 24 and hinge joints 14, 18, 22. The swivel joints 12, 16, 20, 24 are positioned generally axially or longitudinally along the arm 2. The hinge joints 14, 18, 22 are positioned generally at 90° to the swivel joints or 90° to the longitudinal axis of the arm 2. The swivel and hinge joints are generally paired up as shown in FIGS. 1A-1D but the joints may be arranged in other configurations. Because of the multiple rotary joints, the arm 2 is manually-positionable meaning that a user is free to manually move the probe 6 to virtually any position within a radius anchored at the base 4 of the CMM 1. Each of these joints are generally shown in FIGS. 2-6.

In general, the magnetic holder 5 of the base 4 attaches the CMM 1 to a working surface, the base 4 attaches to the swivel joint 12, which attaches to the hinge joint 14, which attaches to the swivel joint 16, which attaches to the hinge joint 18, which attaches to the swivel joint 20, which attaches to the hinge joint 22, which attaches to the swivel joint 24, which attaches to the measurement probe 6.

Figure 2A:
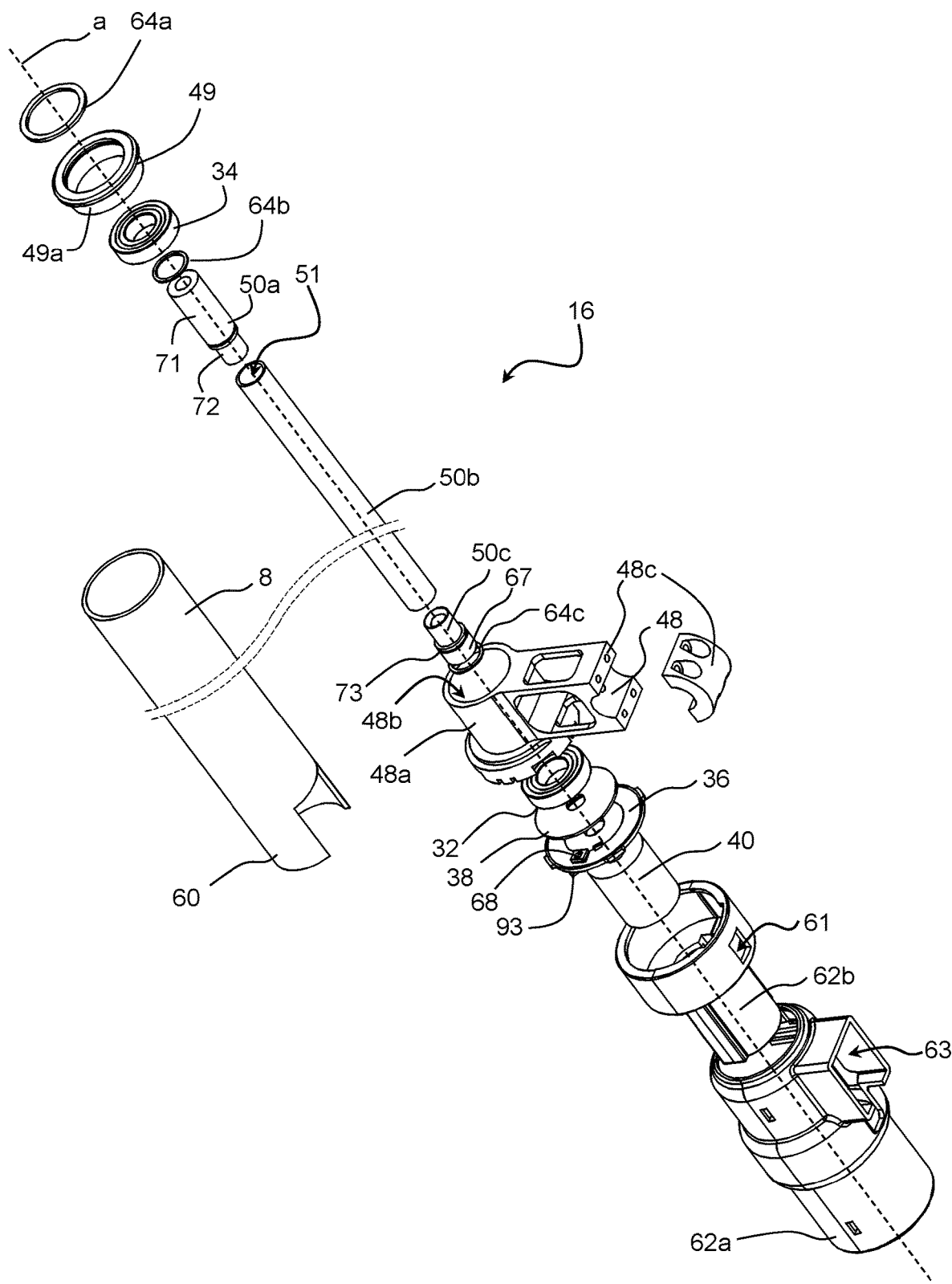
FIG. 2A and 2B illustrate partial exploded and cross-sectional views, respectively, of an exemplary swivel joint of the CMM of FIGS. 1A-1D.
Figure 2B:
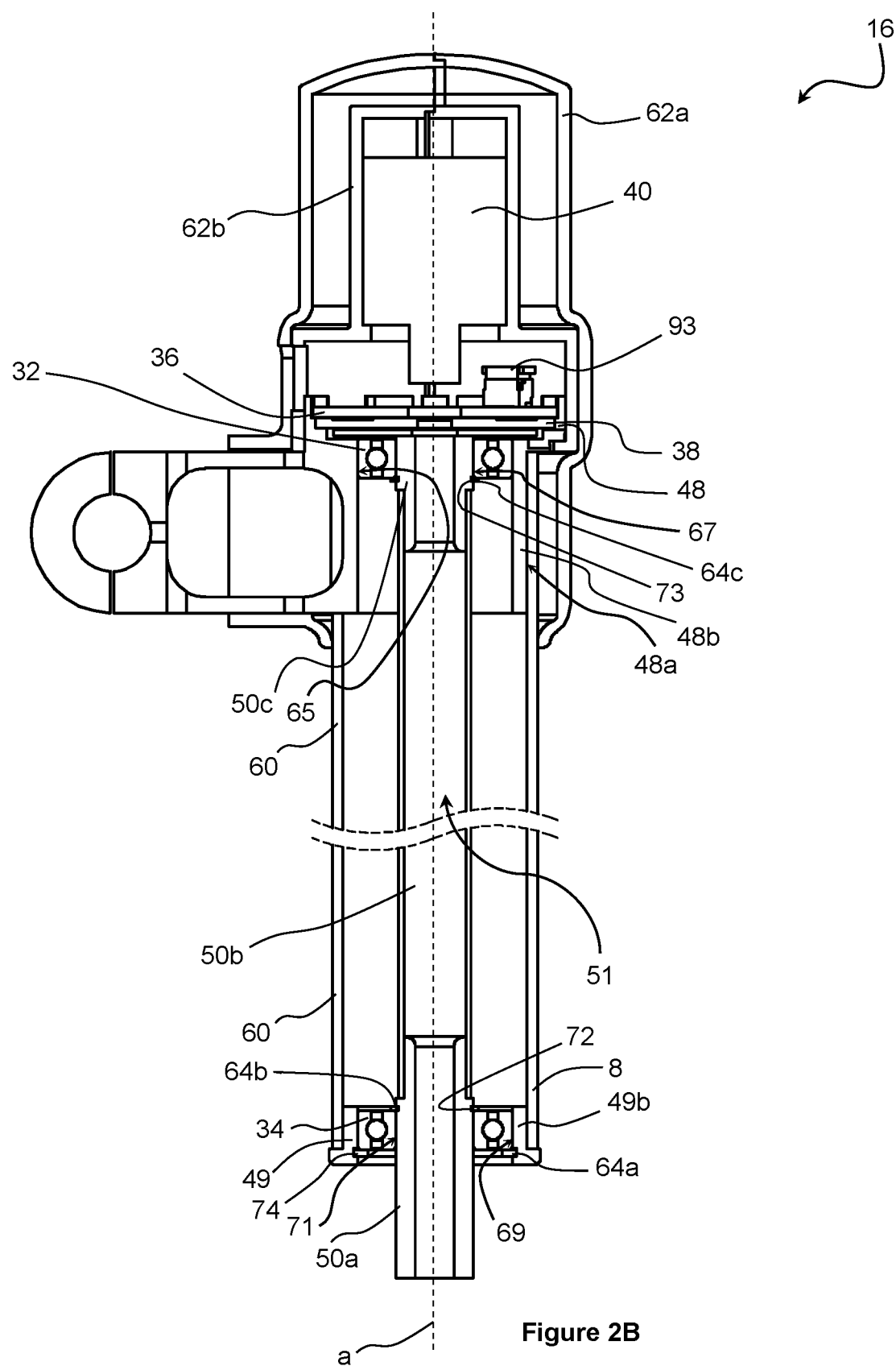

FIG. 2A illustrates a partial exploded view of exemplary swivel joint 16 while FIG. 2B illustrates a partial cross-sectional view of swivel joint 16. Each of the figures illustrates only the ends of the swivel joint 16; the middle portion of the swivel joint not illustrated corresponds to the arm segment 8. The swivel joint 16 will be used here to describe swivel joints 12, 16, 20, 24 in general even though the swivel joints may not be identical. The swivel joints 16 and 20 are very similar. Swivel joint 24 is also similar to swivel joints 16 and 20 except that swivel joint 24 has a shorter shaft.

The swivel joint 16 may include housings 48, 49, shaft portions 50a, 50b, and 50c, bearings 32, 34, encoder PCB 36, encoder disk 38, and slip ring 40. The bearings 32, 34 may be steel or stainless steel bearings or the bearings 32, 34 may be ceramic bearings. Steel or stainless steel bearings are bearings whose balls (or equivalent elements, e.g., rollers) and inner and outer races are fabricated from steel or stainless steel. Ceramic bearings are bearings whose balls (or equivalent elements, e.g., rollers) and inner and outer races are fabricated from ceramic such as, for example, silicon nitride, alumina oxide, zirconia oxide, silicon carbide, etc. The shaft portions 50a and 50c may be operably attached to the ends of the shaft portion 50b to form a shaft assembly 50. The shaft portions 50a, 50b, and 50c may be fabricated of rigid yet relatively lighter material such as, for example, carbon fiber, aluminum, etc. as well as from steel. The tube 60 within which the shaft portion 50b resides may be fabricated of the same rigid yet relatively light material as the shaft portions as well as from steel. The swivel joint 16 may also include covers 62a-b and various hardware such as the snap rings 64a-c.

At one end of the swivel joint 16, the housing 48 has a barrel portion 48a whose outer surface operably attaches to one end of the tube 60 of the corresponding arm segment (arm segment 8 in the case of swivel joint 16). The housing 48 also has a shaft connecting portion 48c that operably connects the swivel joint 16 to the previous hinge joint (see FIGS. 1A-1D). In the case of swivel joint 16, the shaft connecting portion 48c connects the swivel joint 16 to the shaft of the hinge joint 14. At the other end of the swivel joint 16, the housing 49 has a surface 49a that operably attaches to a second end of the tube 60 of the corresponding arm segment (arm segment 8 in the case of swivel joint 16). The housing 49 also has a port 49b within which an end of the shaft assembly resides, particularly shaft portion 50a.

As may be best seen in FIG. 2B, at one end of the swivel joint 16, the inner diameter 65 of the port 48b of the housing 48 engages (e.g., fixedly attaches to) the outer diameter or outer race of the bearing 32. The port 48b of the housing 48 may, for example, be glued to the outer diameter or outer race of the bearing 32. The shaft portion 50c, for its part, has an outer diameter 67 that engages (e.g., is fixedly attached to) the inner diameter or inner race of the bearing 32. The shaft portion 50c may, for example, be glued to the inner diameter or inner race of the bearing 32. At the other end of the swivel joint 16, the inner diameter 69 of the port 49b of the housing 49 engages (e.g., fixedly attaches to) the outer diameter or outer race of the bearing 34. The port 49b of the housing 49 may, for example, be glued to the outer diameter or outer race of the bearing 34. The shaft portion 50a, for its part, has an outer diameter 71 that engages (e.g., is fixedly attached to) the inner diameter or inner race of the bearing 34. The shaft portion 50a may, for example, be glued to the inner diameter or inner race of the bearing 34. The shaft assembly 50, therefore, rotates about the axis of rotation a of the bearings 32 and 34 and the housings 48 and 49.

The PCB 36 of the swivel joint 16 has installed thereon at least one transducer configured to output an angle signal corresponding to an angle of rotation of the shaft assembly 50 relative to the housing 48, 49 about the axis of rotation a. Each transducer comprises an optical encoder that has two primary components, a read head 68 and the encoder disk 38. In one embodiment, two read heads 68 are positioned on PCB 36. In the illustrated embodiment, the encoder disk 38 is operably attached to an end of the shaft assembly 50 (e.g., using a suitable adhesive) spaced from and in alignment with read heads 68 on PCB 36, which is operably attached to the housing 48 (e.g., using a suitable adhesive). The locations of disk 38 and read heads 68 may be reversed whereby disk 38 may be operably attached to housing 48 and read heads 68 rotate with shaft assembly 50 so as to be rotatable with respect to each other while maintaining optical communication. Encoders are commercially available from, for example, Celera Motion under trade names such as MicroE encoders. Each PCB 36 may additionally include a processor for receiving angle signals from the read heads 68, and a transceiver and connector 93 for connecting the PCB 36 to the communication bus of the CMM 1 and/or other wiring. Each of the PCB 36 may also include a temperature sensor connected to the processor to provide for thermal compensation due to room temperature variation.

The cover 62b operably attaches to the housing 48 to cover and seal the PCB 36 and encoder disk 38 from dust contamination. The cover 62a operably attaches over the cover 62b and portions of the housing 48 and tube 60 for cosmetic appearance. The cover 62b has the opening 63 from which the shaft connection portion 48c of the housing 48 protrudes to operably connect the swivel joint 16 to the hinge joint 14.

Swivel joint 16 (as well as other joints in CMM 1) may have unlimited rotation, meaning that it may rotate 360° about its axis of rotation a. Thus, slip ring 40 is used and provides unlimitedly rotatable electrical connections to swivel joint 16. Shafts used herein in swivel joints such as the shaft 30 of base swivel joint 12 and the shaft assembly 50 of swivel joint 16 may be hollow (i.e., have an axial opening 51). Shafts used herein in hinge joints such as the shaft 80 of hinge joint 18 described below may also be hollow and may also include an aperture 81 (see FIG. 6B). Back to FIGS. 2A and 2B, as illustrated, the housing cover 62a has the opening 63, the cover 62b has the opening 61, and the housing 48 has the opening 48d which aligns with the aperture 81 of the shaft 80 of the hinge joint 18. Thus, communication bus wiring may enter the swivel joint 16 from the aperture 81 of hinge joint 14, through the opening 48d, through the opening 63, the opening 61 and connect to PCB 36, which connects to the slip ring 40. From the slip ring 40, wiring may travel through the axial opening 51 of the shaft 50 to the next hinge joint. Such wiring is shown diagrammatically below.

The shaft portions 50a and 50c may have grooves 72, 73 machined or otherwise formed thereon. The snap rings 64b-c may engage the grooves 72, 73 to retain the shaft assembly 50 axially in place in relation to the rest of joint 16 and the bearings 32, 34. Similarly, the housing 49 may have a groove 74 machined or otherwise formed thereon. The snap ring 64*a* may engage the groove 74 to retain the housing 49 axially in place in relation to the rest of joint 16 and the bearings 32, 34. In one embodiment, instead of or in addition to the combination of the grooves 72, 73 and the snap rings 64*b-c* to retain the shaft 50 axially in place in relation to the rest of joint 16 and the bearings 32, 34, the shaft 50 may be fixedly attached to the inner diameters or inner races of the bearings 32, 34 by use of an adhesive. Similarly, in one embodiment, instead of or in addition to the combination of the groove 74 and the snap ring 64*a* to retain the housing 49 axially in place in relation to the rest of joint 16 and the bearings 32, 34, the surface 71 of the housing 49 may be fixedly attached to the outer diameter or outer race of the bearing 34 by use of an adhesive.

Shoulderless shafts and housings such as those illustrated in FIGS. 2A and 2B may be manufactured by grinding and honing processes that may be an order of magnitude more precise than machining process used to manufacture the shouldered or flanged shafts and housings of the prior art. The shoulderless shafts and housings disclosed herein may thus be significantly more precisely built resulting in significant improvements in the precision of measurements that may be achieved at the joint 16 and similar joints of the CMM 1. In part because of the shoulderless shafts and housings disclosed herein, the CMM 1 achieves significantly better accuracy than prior art portable coordinate measurement machines.

The swivel joint 16 of arm segment 8 is a relatively long joint as compared to, for example, joint 14 as may be appreciated from FIGS. 1A-1D. The bearings 32 and 34 are located far apart. The shaft 50 has three parts, the middle portion 50*b* having end portions 50*a* and 50*c* attached to the ends of the middle portion 50*b* far apart from each other. The outer tube 60 is long with housing ends 48 and 49 spaced far apart from each other.

Figure 3:
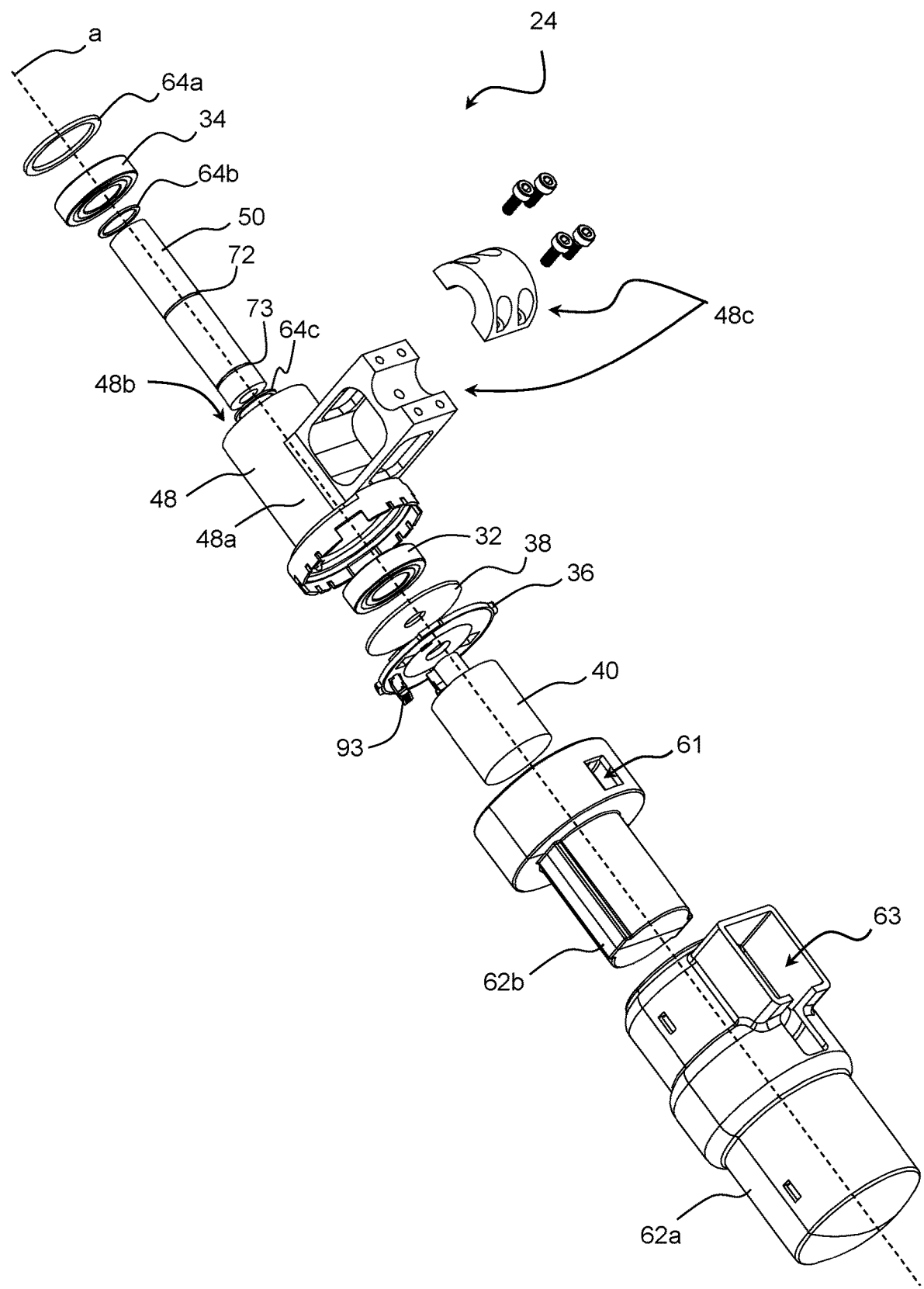
FIG. 3 illustrates an exploded view of an exemplary swivel joint of the CMM of FIGS. 1A-1D.

FIG. 3 illustrates an exploded view of an exemplary swivel joint 24. Swivel joint 24 is similar to swivel joints 16 and 20 described above except that swivel joint 24 has a shorter shaft 50 whose length corresponds to the distance between swivel joint 24 and probe 6 being shorter than the distance between, for example, swivel joint 16 and hinge joint 18. Thus, the probe 6 rotates about the axis a of the swivel joint 24 and the swivel joint 24 detects the angle of rotation of the probe 6, which is attached to the end of the swivel joint 16. See FIGS. 1A-1D.

Figure 4A:
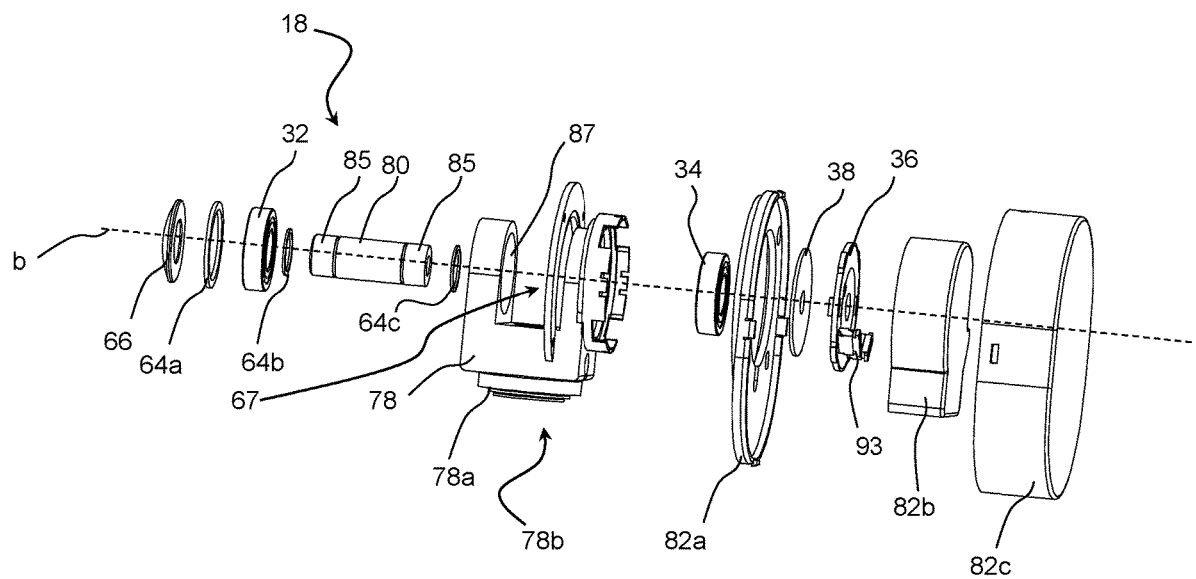
FIGS. 4A, 4B, and 4C illustrate exploded, cross-sectional, and magnified views, respectively, of an exemplary hinge joint.
Figure 4B:
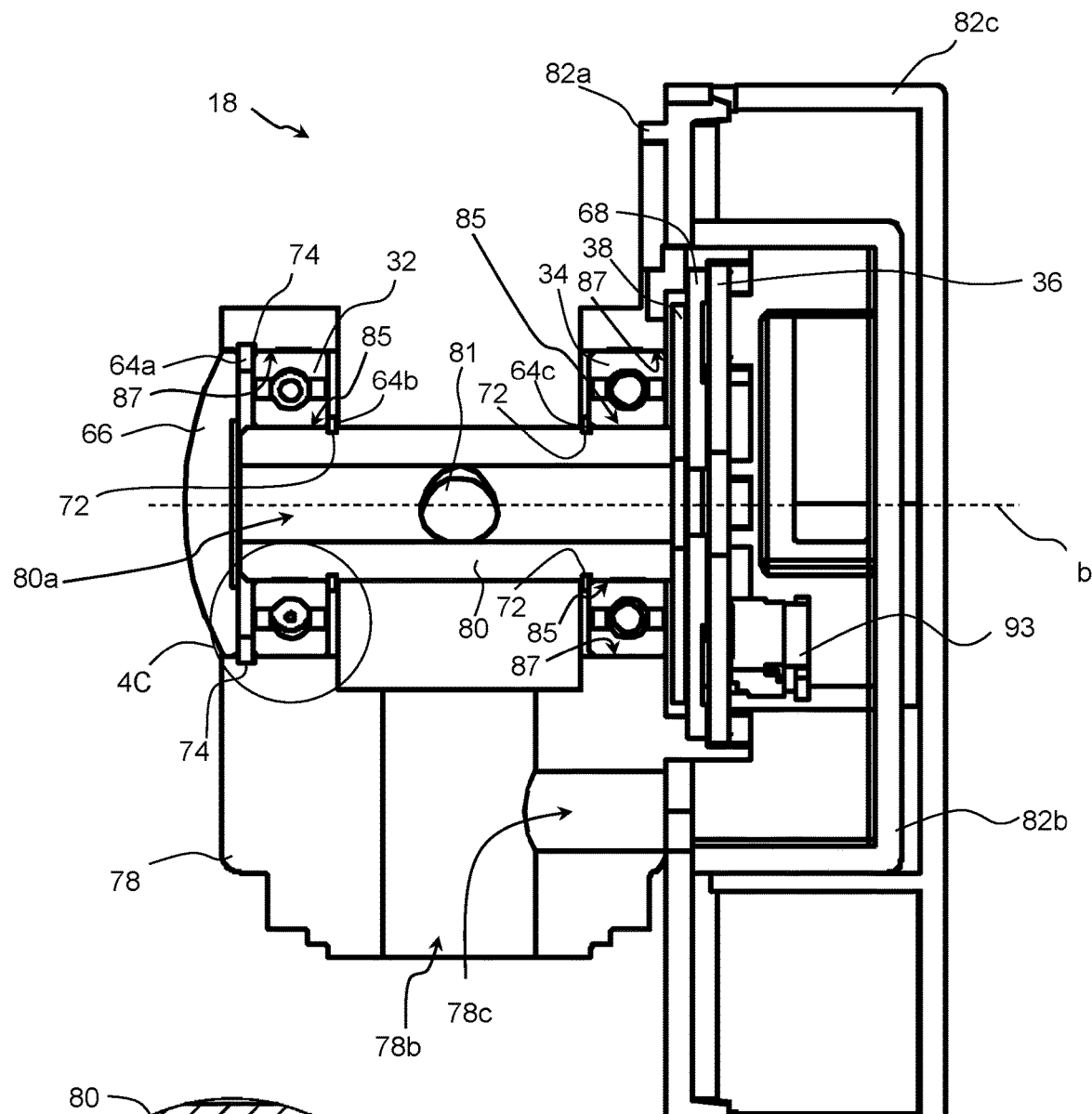
Figure 4C:
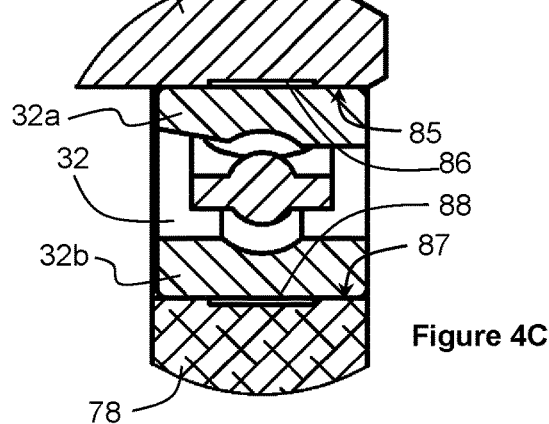

FIG. 4A illustrates an exploded view of exemplary hinge joint 18 while FIG. 4B illustrates a cross-sectional view of hinge joint 18 and FIG. 4C illustrates a magnified view of the interaction between the bearing 32 and the housing 78 and the shaft 80. The hinge joint 18 will be used here to describe hinge joints 14, 18, 22 in general even though the hinge joints may not be identical. Moreover, at least some aspects (e.g., interaction between bearings 32, 34 and housing 78, and bearings 32, 34 and shaft 80) of this description of hinge joint 18 may also apply to swivel joints 12, 16, 20, 24. At least some of the components of hinge joint 18 are substantially similar to components discussed in detail above in reference to swivel joints 12 and 16 and thus these similar components are identified in FIGS. 4A-4C with the same reference designators as in the previous figures.

The hinge joint 18 may include housing 78, shaft 80, bearings 32, 34, encoder PCB 36, and encoder disk 38. The housing 78 has an opening 78*b* to which the shaft of the previous swivel joint (shaft 50 of swivel joint 16 in the case of hinge joint 18) connects. The hinge joint 18 may also include covers 82*a-c* and various hardware such as the snap rings 64*a-c* and cap 66.

As may be best seen in FIG. 6B, the housing 78 has ports 87 that engage (e.g., fixedly attach to) the outer diameters or outer races of the bearings 32, 34. The ports 87 of the housing 78 may, for example, be glued to the outer diameter or outer race of the bearings 32 and 34. In the embodiment of FIGS. 6A and 6B the housing 78 has two ports 87. The shaft 80, for its part, has an outer diameter 85 that engages the inner diameter or inner race of the bearings 32, 34. The shaft 80 rotates about the axis of rotation b of the bearings 32, 34 and the housing 78 of the hinge joint 18.

Similar to the swivel joints discussed above, the PCB 36 of the hinge joint 18 has installed thereon at least one transducer configured to output an angle signal corresponding to an angle of rotation of the shaft 80 relative to the housing 78 about the axis of rotation b. Each transducer comprises an optical encoder that has two primary components, a read head 68 and the encoder disk 38. In the illustrated embodiment, two read heads 68 are positioned on PCB 36. In the illustrated embodiment, the encoder disk 38 is operably attached to an end of the shaft 80 (e.g., using a suitable adhesive) spaced from and in alignment with read heads 68 on PCB 36, which is operably attached to the housing 78 (e.g., using a suitable adhesive). The locations of disk 38 and read heads 68 may be reversed whereby disk 38 may be operably attached to housing 78 and read heads 68 rotate with shaft 80 so as to be rotatable with respect to each other while maintaining optical communication.

The cover 82*b* operably attaches to the housing 78 to cover and seal the PCB 36 and encoder disk 38 from dust. The covers 82*a* and 82*c* operably attach to each other at one end of the shaft 80 and the cap 66 caps to the opposite end of the shaft 80 to protect the bearings.

Communications bus wiring may enter the hinge joint 18 from the axial opening 51 of the shaft 50 of the previous swivel joint through the openings 78*b*, 78*c* of the housing 78. The wiring may then connect to the PCB 36 and depart the hinge joint 18 through the axial opening 80*a* and the aperture 81 of shaft 80. Such wiring is shown diagrammatically below.

The shaft 80 may have grooves 72 machined or otherwise formed thereon. The snap rings 64*b-c* may engage the grooves 72 to retain the shaft 80 axially in place in relation to the rest of joint 18 and the bearings 32, 34. Similarly, the housing 78 may have a groove 74 machined or otherwise formed thereon. The snap ring 64*a* may engage the groove 74 to retain the housing 78 axially in place in relation to the rest of joint 18 and the bearings 32, 34. In one embodiment, instead of or in addition to the combination of the grooves 72 and the snap rings 64*b-c* to retain the shaft 80 axially in place in relation to the rest of joint 18 and the bearings 32, 34, the shaft 80 may be fixedly attached to the inner diameters or inner races of the bearings 32, 34 by use of an adhesive. Similarly, in one embodiment, instead of or in addition to the combination of the groove 74 and the snap ring 64*a* to retain the housing 78 axially in place in relation to the rest of joint 18 and the bearings 32, 34, the ports 87 of the housing 78 may be fixedly attached to the outer diameters or outer races of the bearings 32, 34 by use of an adhesive.

FIG. 4C illustrates a magnified view of the interaction between the bearing 32 and the housing 78 and the shaft 80. The shaft 80 has an outer diameter or outer surface 85 that engages the inner diameter or inner race 32*a* of the bearing 32. The shaft 80 may, for example, be glued to the inner diameter or inner race 32a of the bearing 32. In the example of FIG. 4C, the shaft 80 has formed thereon a groove 86 to form a gap in which an adhesive for adhering the shaft 80 to the inner diameter or inner race 32a of the bearing 32 may reside. Similarly, the housing 78 may have formed thereon a groove 87 to form a gap in which an adhesive for adhering the housing 78 to the outer diameter or outer race 32b of the bearing 32 may reside.

Prior art CMM typically used stainless steel shafts and housings to complement stainless steel bearings. However, stainless steel is comparatively heavy, making for bulky and heavy CMM that were difficult to transport and fatiguing to operate. Departing from the typical stainless steel on stainless steel construction was not a viable option, however, because of temperature effects that negatively affected measurements. When a CMM joint including its bearing assembly is heated or cooled, the length/shape of the various components also changes due to the change in temperature. For the typical stainless steel on stainless steel construction this is not a problem because the length/shape of the components, made from the same material, change in unison, preserving clearances, preload, rigidity, etc. even through the ambient temperature range. However, where a lighter, nimbler CMM is desired, these temperature effects become a significant challenge.

making the CMM lighter, an aluminum shaft and aluminum housing are used instead (configuration 2: Aluminum in FIGS. 4D and 4E), moment of rigidity and radial rigidity vary significantly through the ambient temperature range (10° C.-40° C.). As the temperature increases above the reference temperature (20° C.), the aluminum shaft and housing expand significantly more than the bearings' stainless steel, decreasing bearing assembly rigidity. As the temperature decreases below the reference temperature (20° C.), the aluminum shaft and housing contract significantly more than the bearings' stainless steel, increasing bearing assembly rigidity. This is because the coefficient of thermal expansion (CTE) of aluminum is 21-24 µm/(m ° C.) is significantly different from steel's CTE of 9.5 to 17.5 µm/(m ° C.) and, thus, the aluminum components expand/contract at a different rate from the steel components as temperature changes. In most applications, radial rigidity and moment rigidity are of primary importance. This significant variation in moment of rigidity and radial rigidity causes a proportionally significant variation in position measurements through the temperature range that would be unacceptable for a CMM.

In an articulated portable CMM, the rigidity of certain axes' bearing assemblies has a bigger contribution to the overall position measurement error. Bigger bearings may be used to achieve better bearing assembly rigidity. Another

TABLE 1

| Description | Temp (° C.) | Single Ball Preload (N) | Moment Rigidity (Nm/mrad) | Percent Change Across Range | Radial Rigidity (N/micron) | Percent Change Across Range |
|---|---|---|---|---|---|---|
| Stainless Steel Shaft and | 10 | 10.3812 | 51.61 | | 127.571 | |
| Housing with 22 lb preload | 20 | 10.3812 | 51.61 | | 127.571 | |
| | 40 | 10.3812 | 51.61 | 0.00% | 127.571 | 0.00% |
| Aluminum Housing and Shaft | 10 | 32.3057 | 74.522 | | 189.19 | |
| with .0003" (7.6 micron) | 20 | 20.0088 | 63.557 | | 161.076 | |
| Press fit | 40 | 1.71336 | 28.047 | 165.70% | 70.81 | 167.18% |
| Aluminum Housing and | 10 | 12.6301 | 52.857 | | 142.059 | |
| Carbon Fiber Shaft with | 20 | 10.8412 | 51.126 | | 133.106 | |
| .0003" (7.6 micron) Press fit | 40 | 11.2934 | 53.328 | −0.88% | 130.248 | 9.07% |

Table 1 (shown above) illustrates the issue. To arrive at the results shown in Table 1 finite element analysis software (e.g., SolidWorks®, Ansys®, etc.) was used to find deformation due to shrink fit and ball bearing loads. These deformations results were entered into bearing analysis software (e.g., Orbis from Halpin Engineering, LLC, Mesys rolling bearing analysis, etc.) to find resulting internal ball bearing loads, rigidity, etc. To illustrate, we use a bearing assembly including two bearings 32, 34 (e.g., SKF 71901 CD, 24 mm OD, 12 mm ID and 6 mm wide) as shown in FIGS. 4A-4C. The bearings are placed far enough apart (e.g., 35 mm) to optimize the bearing assembly over the operating temperature. The shaft 80 is slide fit inside the bearings 32, 34 inner ID and the bearing OD is 7.5 µm press fit inside housing 78 to produce a radial preload at a preload ambient temperature (e.g., 20° C.). The preload ambient temperature may be chosen to be in the CMM's operating temperature range (e.g., 10° C.-40° C.).

Figure 4D:
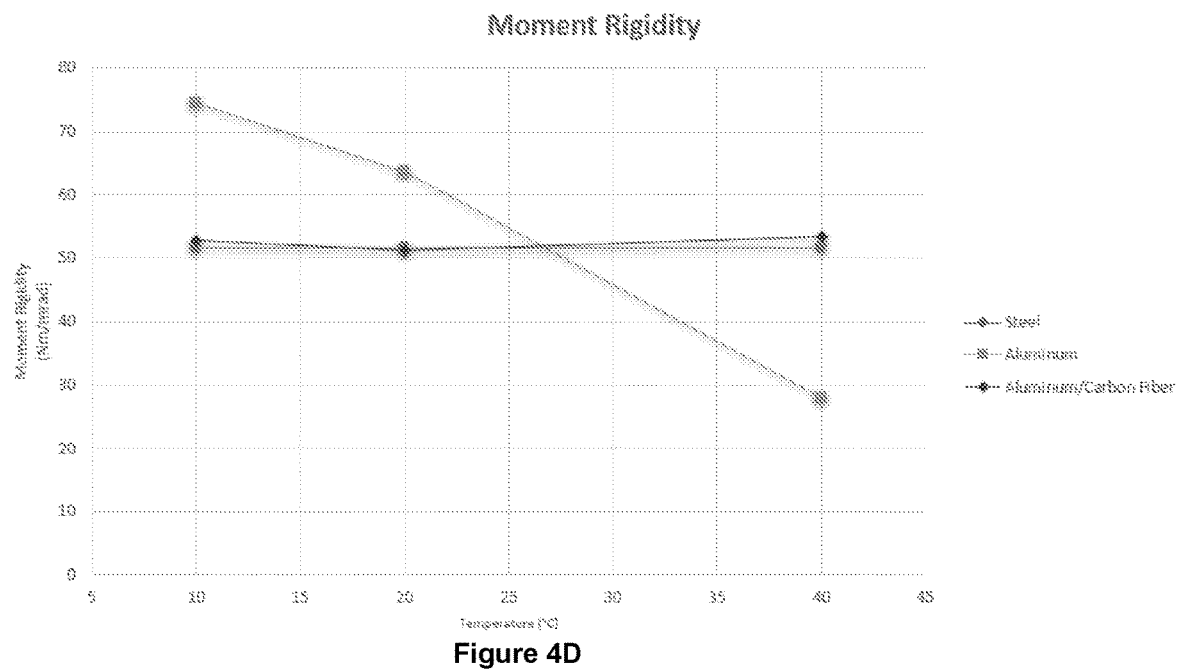
FIGS. 4D and 4E illustrate exemplary charts comparatively illustrating moment rigidity and radial rigidity, respectively, of the exemplary hinge joint over its ambient temperature range.
Figure 4E:
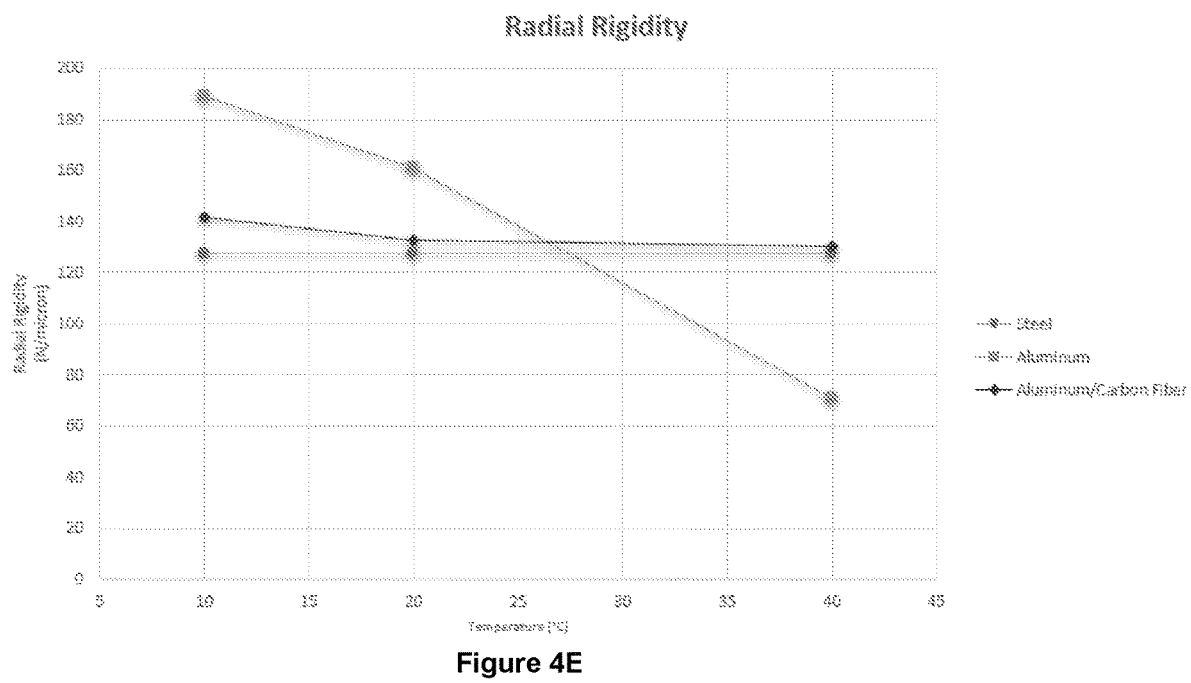

The temperatures of the first and second bearings 32, 34, the shaft 80, and the housing 78 change passively with ambient temperature. As table 1 and FIGS. 4D and 4E show, in configuration 1, stainless steel shaft and stainless steel housing (Steel in FIGS. 4D and 4E), moment of rigidity and radial rigidity remain constant through the ambient temperature range (10° C.-40° C.). However, if for the sake of approach may involve placing bearings further apart. Yet another solution may involve using two bearings 32 back to back (or double bearings) and two bearings 34 back to back (or double bearings) to increase rigidity. These approaches may be acceptable solutions for axes lower in the CMM (e.g., joints 12, 14 and 16), since the added weight at these axes does not contribute significantly to operator fatigue. The weight of axes higher in the CMM (18, 20, 22, and 24), however, is a larger contributor to operator fatigue and the rigidity of these axes contributes more significantly to device performance. While adding a second pair of bearings may double a bearing assembly's radial rigidity and improve moment rigidity by 80 percent, it may increase the weight of an axis by 45 grams in the case of aluminum and 95 grams in the case of stainless steel.

One method to address the temperature effect instead of or in addition to those described above include using Belleville Disc Springs for ball bearings. (https://www.mcmaster.com/bearing-preload-washers). Disc Springs rigidity is two orders of magnitude smaller than axial rigidity of bearing assembly (about 0.16 N/micron vs 20 N/micron). Another method may involve using tolerance rings, whose rigidity is significantly smaller than the radial rigidity of the bearing assembly (about 15 to 30 N/micron vs 120 N/micron). Also, tolerance ring rigidity is in parallel with bearing radial rigidity, making the effective radial rigidity of the bearing assembly about 13 to 24 N/micron. Moment rigidity is directly proportional to the radial rigidity, hence reducing moment rigidity significantly (10 Nm/mrad vs 50 Nm/mrad).

Another way of reducing the temperature effect, as discovered by the inventors here, is to use a shaft and a housing of significantly different CTE. For example, the bearing assembly may use a shaft made out of a material having a CTE close to zero such as, for example, invar (CTE=0 to 1.5 μm/(m ° C.)) or carbon fiber (CTE=−2 to +2 μm/(m ° C.)), and a housing made of aluminum. The CTE mismatch between the aluminum housing and the low CTE shaft (e.g., invar, carbon fiber, etc.) increases the preload on the bearing assembly as the ambient temperature rises above 20° C. This increase in preload counters the effect of loss of preload due to the difference in radial expansion between the aluminum housing and the steel bearings. Similarly, as ambient temperature falls below 20° C., the CTE mismatch between the aluminum housing and the low CTE shaft reduces the preload on the bearing assembly. This decrease in preload counters the effect of the rise of preload due to difference in radial shrinkage of the aluminum housing and the steel bearings.

Table 1 (shown above) and FIGS. 4D and 4E illustrate this solution at work in configuration 3. In the case of an aluminum housing and a carbon fiber shaft (Aluminum/Carbon Fiber in FIGS. 4D and 4E), the preload remains within a relative tight range, the moment rigidity remains within 1% (−0.88%), and the radial rigidity remains within 10% (9.07%) through the ambient temperature range (10° C.-40° C.). As table 1 and FIGS. 4D and 4E show, the configuration 3 (aluminum housing and carbon fiber shaft) closely matches configuration 1 (steel housing and steel shaft) in moment rigidity and radial rigidity. This approximately constant moment of rigidity and radial rigidity through the temperature range result in better accuracy in position measurements through the temperature range. This improves CMM performance while significantly reducing its weight and, hence, improving portability and reducing operator's fatigue.

In general, in a case where the CTE of the housing material is greater than the CTE of the ball bearing material, we may select a shaft with lower CTE than the housing material. The higher the CTE difference between the housing and the shaft materials, the closer distance there is between the bearing pair. Examples of housing/shaft combinations in this class include an aluminum (CTE=21 to 24 μm/(m ° C.)) or aluminum alloy housing with an invar (CTE=0 to 1.5 μm/(m ° C.)) shaft, an aluminum or aluminum housing with a carbon fiber (CTE=−2 to +2 μm/(m ° C.)) shaft, and an aluminum or aluminum housing with a titanium (CTE=8 to 11 μm/(m ° C.) or titanium alloy shaft.

In a case where the CTE of the housing material is lower than the CTE of the ball bearing material, we may select a shaft with higher CTE than the housing material. Again, the higher the CTE difference between the housing and the shaft materials, the closer the distance between the bearing pair. Examples of housing/shaft combinations in this class include a titanium (CTE=8 to 11 μm/(m ° C.)) or titanium alloy housing with an aluminum (CTE=21 to 24 μm/(m ° C.)) or aluminum alloy shaft, an invar (CTE=0 to 1.5 μm/(m ° C.)) housing with an aluminum (CTE=21 to 24 μm/(m ° C.)) or aluminum alloy shaft, and a carbon fiber (CTE=−2 to +2 μm/(m ° C.)) housing with an aluminum (CTE=21 to 24 μm/(m ° C.)) or aluminum alloy shaft.

Similar to steel shafts and housings, aluminum, carbon fiber, invar, titanium, etc. shafts and housings may be glued to the inner diameter or inner race 32a of the bearing 32. In the example of FIG. 4C, the shaft 80 has formed thereon a groove 86 to form a gap in which an adhesive for adhering the shaft 80 to the inner diameter or inner race 32a of the bearing 32 may reside. Similarly, the housing 78 may have formed thereon a groove 87 to form a gap in which an adhesive for adhering the housing 78 to the outer diameter or outer race 32b of the bearing 32 may reside.

In another embodiment, ideal or near ideal CTE of all components may be achieved; that is, the housing 78, shaft 80, and ball bearings 32,34 may be chosen to each have CTE near zero. For example, the housing 78 and shaft 80 may be manufactured from carbon fiber and/or invar. Carbon fiber may be the preferred material because of its low weight to strength ratio. The bearings 32, 34 (inner and outer races and balls or rollers) may be made from ceramics (Silicon Nitride (e.g., $SiN_4$), Alumina Oxide (e.g., $Al_2O_3$), Zirconia Oxide (e.g., $ZrO_2$), Silicon Carbide (e.g., SiC), etc.). Ceramics have very low CTE (<3.5 μm/(m ° C.).

Retaining compounds, a type of anaerobic adhesive, are widely accepted as a standard method for assembling press-fitted and slip-fitted parts. However, for bonding a carbon fiber shaft to a steel bearing, it may be recommended to use two-part epoxy. Two-part epoxies typically need a minimum gap of 0.1 to 0.2 mm. A carbon fiber shaft may be precision grinded to achieve a slip fit of about 2.5 micron. In order to use two-part epoxy to bond the precision carbon fiber shaft to the bearing ID 85, a 0.15 mm glue groove may be cut on the carbon fiber shaft. The width of the groove may be half the width of the bearing and may be centered to the bearing ID 85. This may ensure a high strength bond while not compromising the precision. Similarly, two-part epoxy may be used to bond an aluminum housing to a steel bearing OD surface 87. Two-part epoxy creates a better bond between an aluminum housing and a bearing OD 87 through a wider temperature range.

Figure 5:
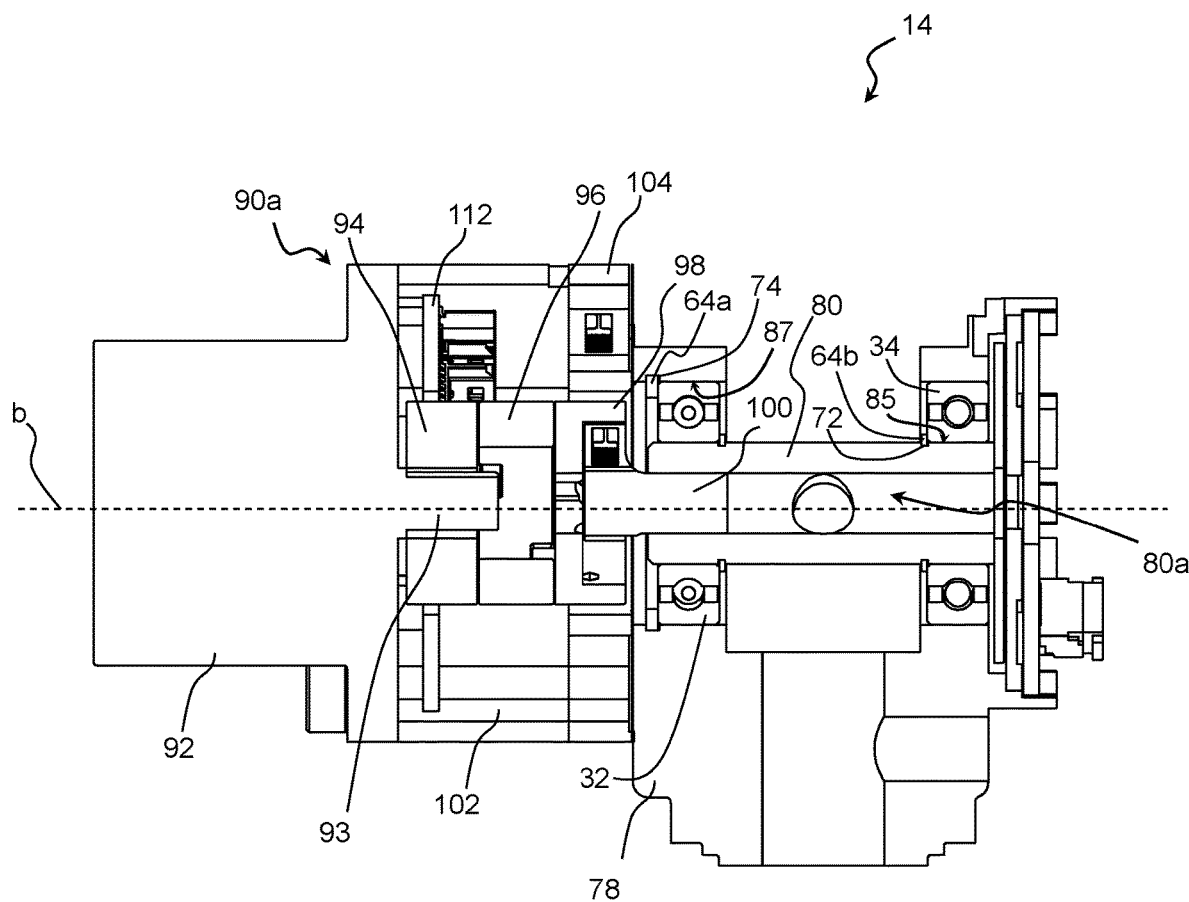
FIG. 5 illustrates a cross-sectional view of an exemplary hinge joint of the CMM of FIGS. 1A-1D including a rotary damper.

FIG. 5 illustrates a cross-sectional view of exemplary hinge joint 14. Hinge joint 22 is very similar to hinge joint 18 described above. Hinge joint 14 is also similar to hinge joints 18 and 22, a significant difference being that the hinge joint 14 includes a rotary damper assembly. In the illustrated embodiment of FIG. 5, the rotary damper assembly is an instrumented assembly 90a as described in detail below. To ease the use of the arm 2, a counterbalance arrangement in the form of the rotary damper assembly 90a may be provided to offset the torque applied by the weight of the articulated arm. The counterbalance prevents the articulated arm 2 from falling down rapidly due to its own weight if the user releases it.

The assembly 90a includes the rotary damper 92 which may be a commercially available rotary damper such as WRD dampers manufactured by Weforma Dampfungstechnik GmbH of Stolberg, Germany. In one embodiment, the rotary damper 92 is a unidirectional rotary damper that provides controlled damping of rotational movement of the shaft about the axis of rotation in one direction of rotation. The assembly 90a may also include damper hub 94, damper sleeve 96, and torque sensor shaft hub 98, which together form an Oldham coupling. The assembly 90a may also include torque sensor shaft 100. The assembly 90a may also include spacer 102, mount 104, and hardware such as bolts.

The damper assembly 90a comes together by first coupling a portion of the torque sensor shaft 100 to the shaft 80 of the hinge joint 14. A portion of the torque sensor shaft 100 may be inserted in and fixedly attached to (e.g., by using adhesive) the axial opening 80a of the shaft 80. The mount 104 is coupled to the housing 78 of the hinge joint 14 by inserting bolts and threading them into threaded openings in the housing 78. The rest of the components of the rotary damper assembly 90a are then stacked in order: the shaft hub 98 on the shaft 100, the damper sleeve 96 on the shaft hub 98, the damper hub 94 on the damper sleeve 96, and the damper hub 94 on the shaft 93 of the rotary damper 92. The spacer 102 is sandwiched between the rotary damper 92 and the mount 104 by threading bolts to threaded apertures of the mount 104. Thus, the rotary damper 92 is operably coupled to the shaft 80 and the housing 78.

The rotary damper 92 provides controlled damping of rotational movement of the shaft 80 about the axis of rotation b. The amount of torque output to control damping provided by the rotary damper 92 may be preadjusted and pre-calibrated to tight specifications. Thus, the rotary damper assembly 90a alleviates problems with adjustment and calibration of counterbalance that were typical to conventional counter balance solutions for portable coordinate measuring machines such as coil springs, torsion springs, and pistons. Also, the rotary damper assembly 90a provides a counterbalance solution that is generally more compact and lighter in weight when compared to conventional counter balance solutions such as coil springs, torsion springs, and pistons.

Figure 6:
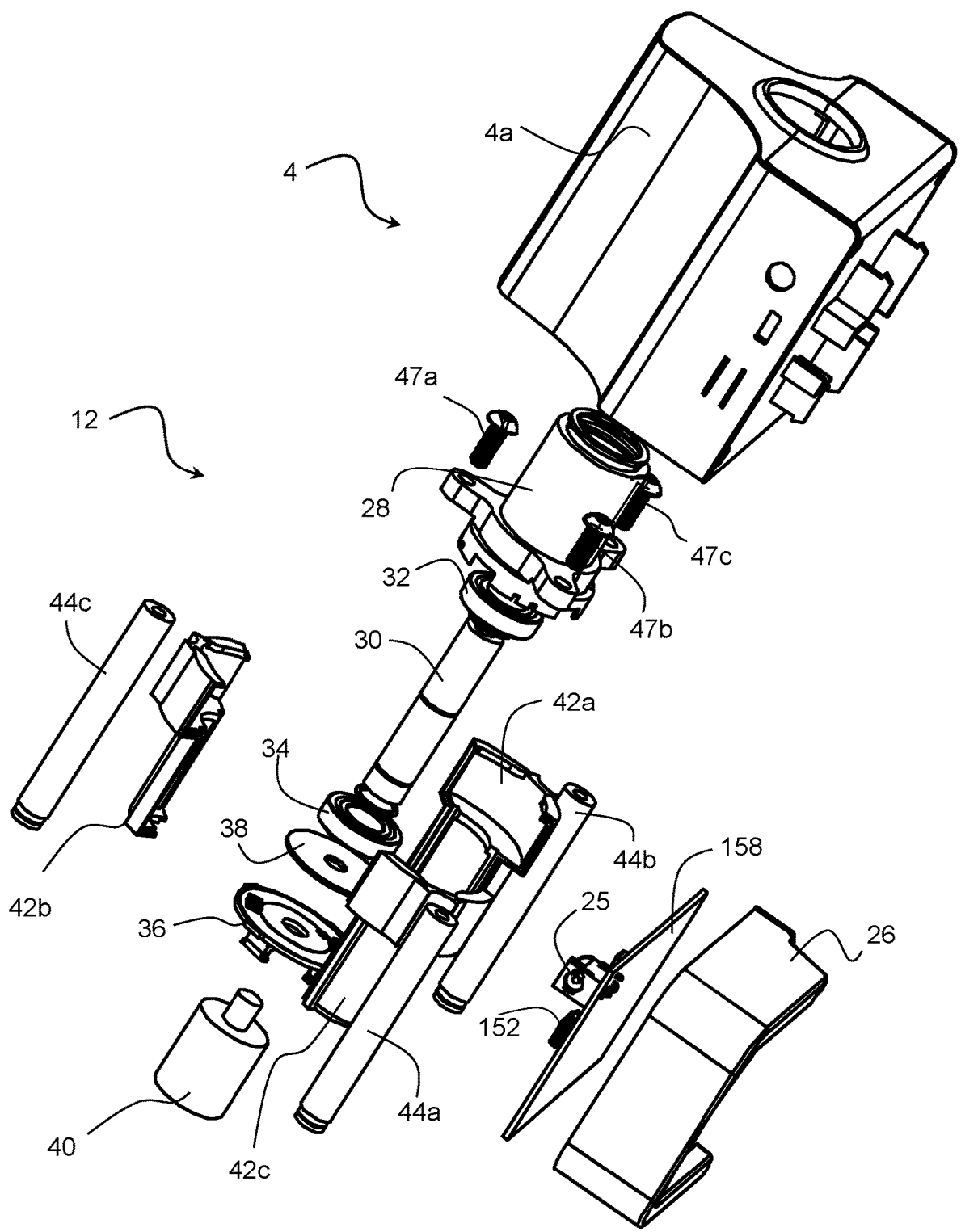
FIG. 6 illustrates an exploded view of an exemplary base and swivel joint of the CMM of FIGS. 1A-1D.

FIG. 6 illustrates an exploded view of exemplary base 4 and swivel joint 12. The base 4 may house a main printed circuit board (PCB) 158 that may receive signals from the various encoder printed circuit boards 36 of the CMM 1. The main printed circuit board 158 may also include a power jack 25 to which a power adapter may be connected to power the CMM 1 and serial communication ports (e.g., USB 152). FIG. 6 also illustrates the base enclosure 4a, which has mounted thereon a battery receptacle 26. The CMM 1 may be portable and, therefore, may be operated on battery power from a battery (not shown) installed to the CMM 1 via the receptacle 26.

The swivel joint 12 may include housing 28, shaft 30, bearings 32, 34, encoder printed circuit board 36, encoder disk 38, and slip ring 40. The swivel joint 12 may also include dust covers 42a-c and various hardware such as the threaded studs 44a-c and screws 47a-c. Swivel joints in general are discussed in detail above in reference to swivel joint 16.

Figure 7:
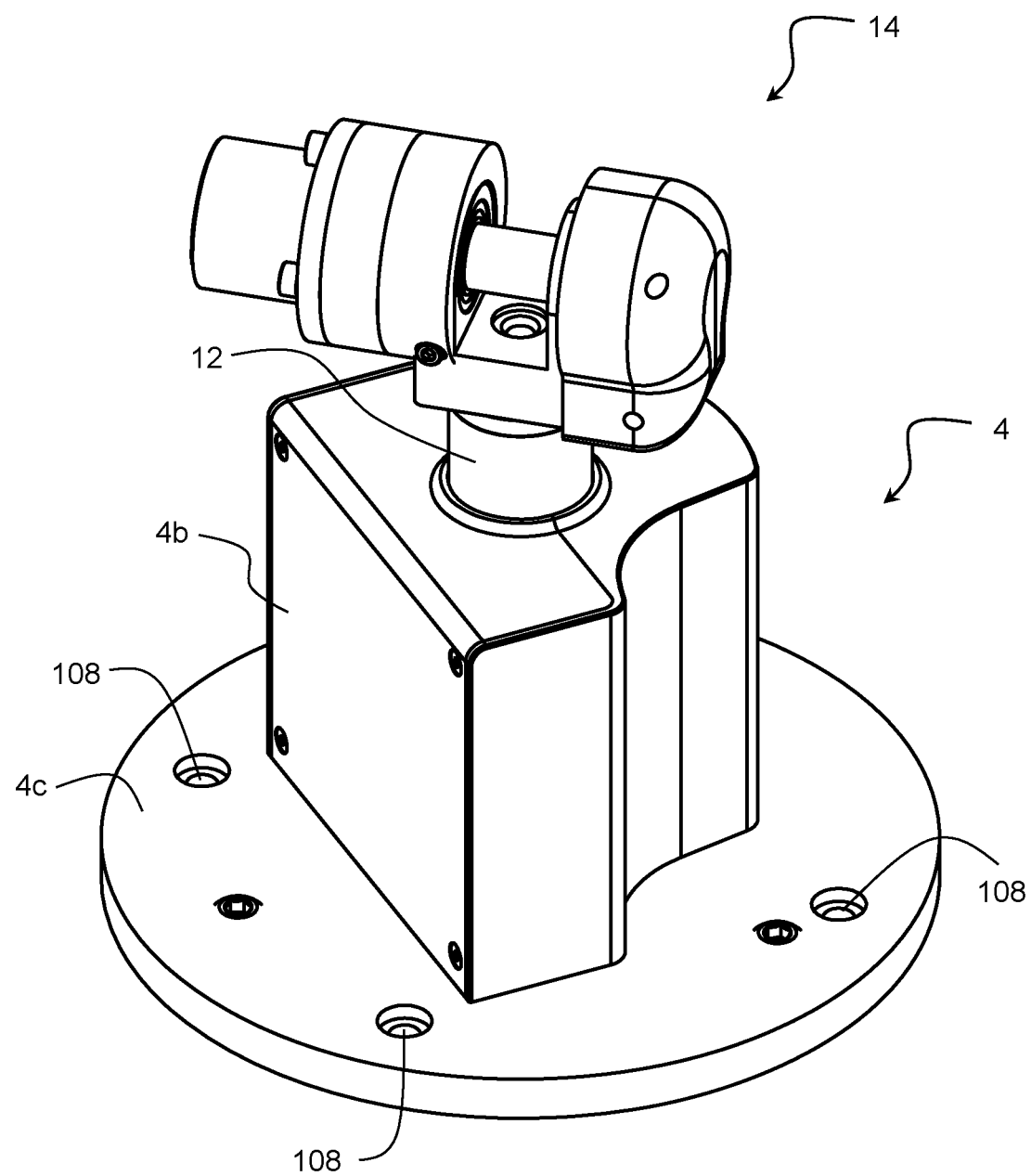
FIG. 7 illustrates a perspective view of the exemplary hinge joint of FIG. 5 mounted to the base and swivel joint of FIG. 6.

FIG. 7 illustrates a perspective view of an exemplary hinge joint 14 (as illustrated in FIG. 5) mounted to a swivel joint 12 and base 4 (as illustrated in FIG. 6). The base 4 includes multiple components such as the base enclosure 4b and the base plate 4c. The base enclosure 4b mounts to the base plate 4c which, in turn, includes mounting holes 108 for fasteners (e.g., bolts) to attach the base 4 to the magnetic holder 5 or to a mounting surface MS.

Figure 8:
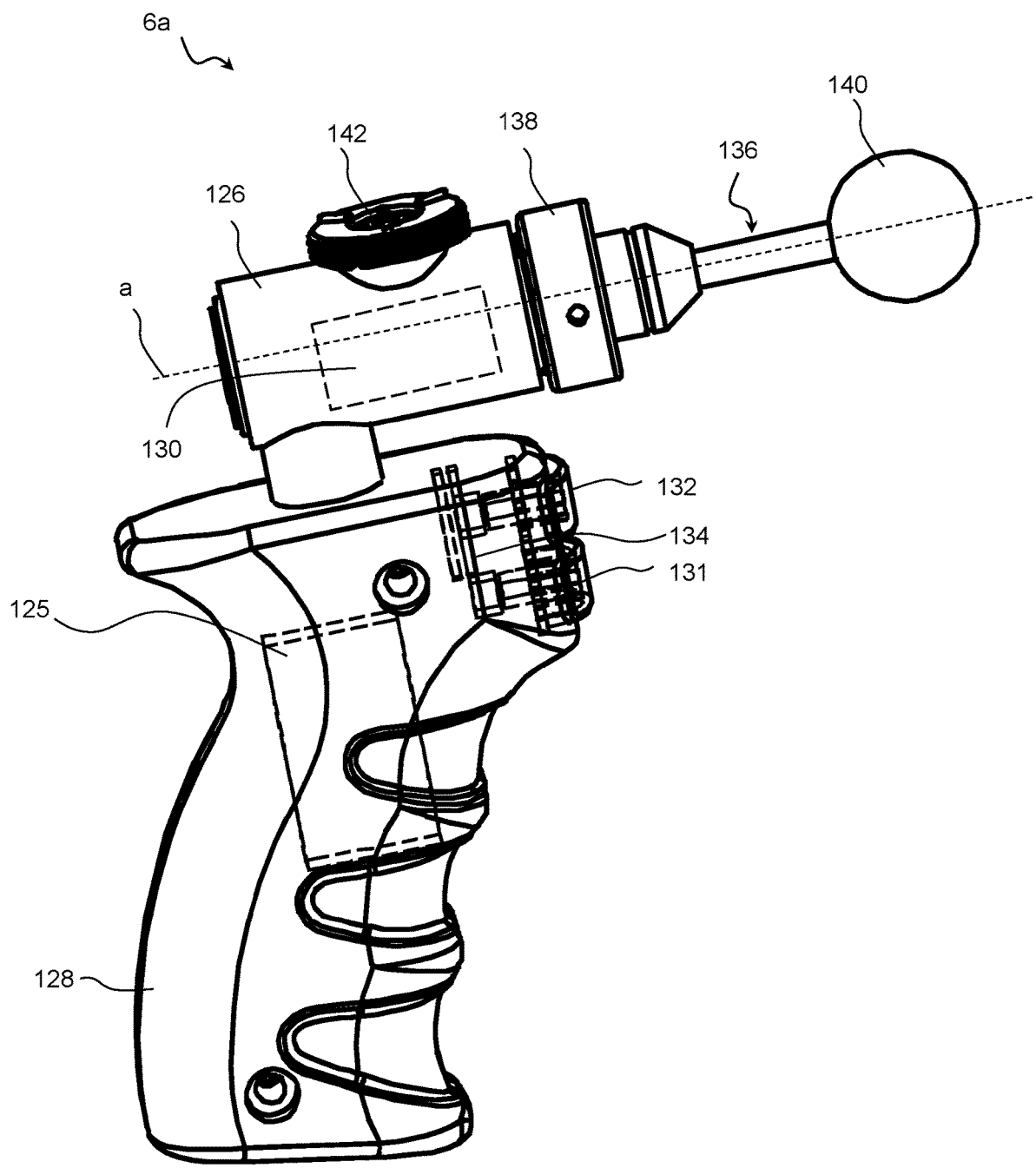
FIG. 8 illustrates a perspective view of an exemplary measurement probe of the CMM of FIGS. 1A-1D.

FIG. 8 illustrates a perspective view of an exemplary measurement probe 6a. Probe 6a includes a housing 126 that has an interior space for housing PCB 130 and a handle 128 that has an interior space for housing PCB 125. The housing 126 and the handle 128 are shown transparent for illustration purposes. Housing 126 operably couples to the swivel joint 24 (see FIGS. 1A-1D). Thus, the probe 6a rotates about the axis a of the swivel joint 24 and the swivel joint 24 detects the angle of rotation of the probe 6a about the axis a.

The measurement probe 6a may also include a probe stem assembly 136 having a probe connector 138 at one end and a probe 140 at the other end. The probe connector 138 connects to the housing 126 and the PCB 130. The probe stem assembly 136 may be a touch trigger assembly which triggers the capture of the position of the probe 140 when the probe 140 touches an object. The PCB 130 receives such a trigger signal and transmits it as described below. The probe stem assembly 136 may also house electronics such as, for example, an integrated circuit (e.g., EEPROM) having stored therein a serial number to uniquely identify a probe stem assembly 136 upon installation to the CMM 1.

Handle 128 may include two switches, namely a take switch 131 and a confirm switch 132. These switches may be used by the operator to take a measurement (take switch 131) and to confirm the measurement (confirm switch 132) during operation. The handle 128 is generally shaped to resemble a person's grip, which is more ergonomic than at least some prior art probes. The handle 128 may also house a switch PCB 134 to which the switches 131 and 132 may mount. Switch PCB 134 is electrically coupled to PCB 125 hosting components for processing signals from the switches 131 and 132. In one embodiment, the PCB 125 includes a wireless (e.g., Wi-Fi, Bluetooth, etc.) transmitter (instead of an electrical connection to the communication bus of the CMM 1) that wirelessly transmits take and confirm signals associated with the switches 131 and 132 to, for example, a host PC that generally controls the CMM 1. Wireless transmission of the take and confirm signals associated with the switches 131 and 132 significantly simplifies construction and wiring of the probe 6a.

The measurement probe 6a may also include an option port 142 to which optional devices such as, for example, a laser scanner (not shown) may be connected. The option port 142 provides mechanical connections for the optional devices to be supported by the measurement probe 6a. The option port 142 may also provide electrical connections for the optional devices to interface with the communication bus of the CMM 1.

Figure 9:
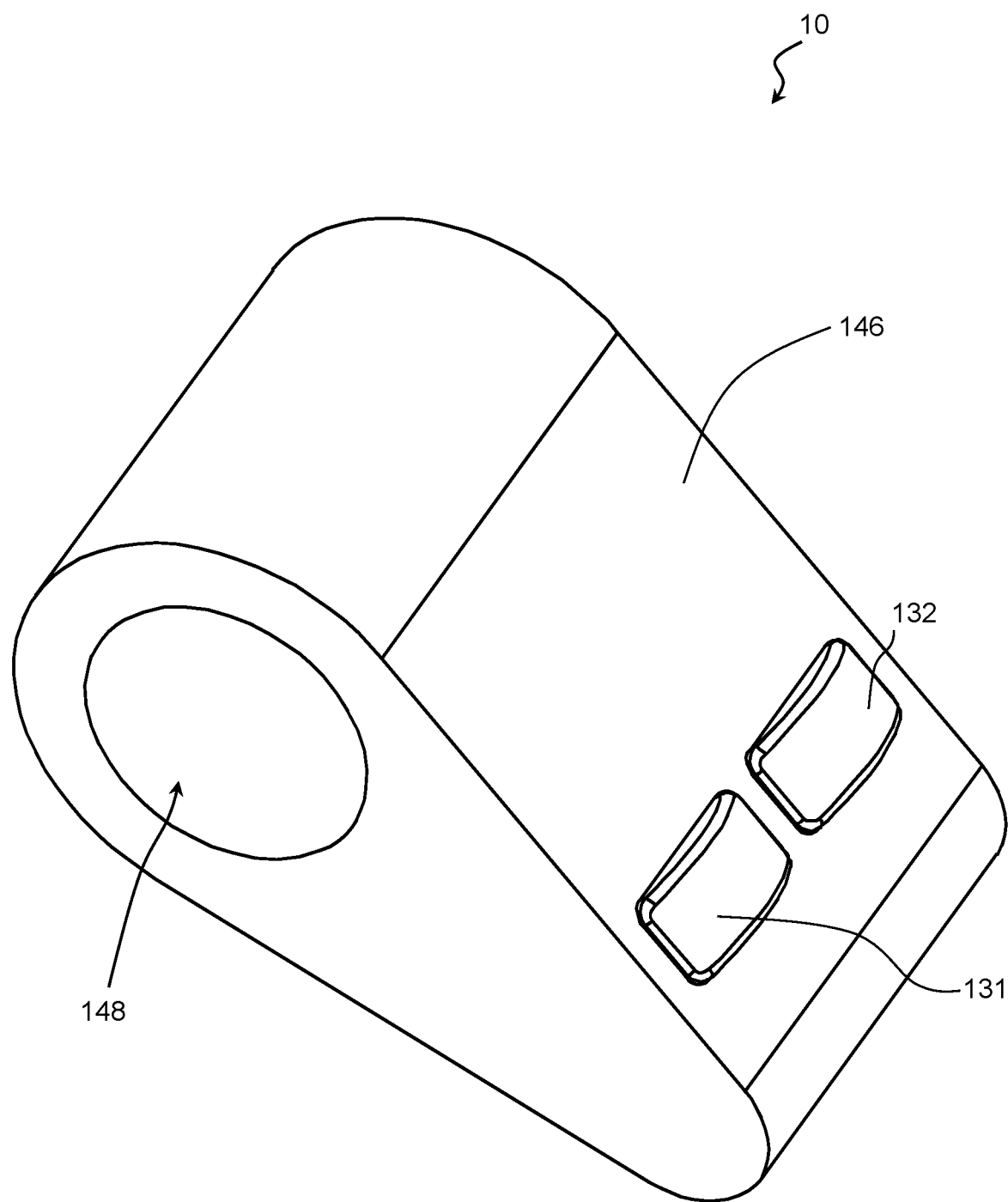
FIG. 9 illustrates a perspective view of an exemplary on-arm switch assembly of the CMM of FIGS. 1A-1D.

FIG. 9 illustrates a perspective view of an exemplary on-arm switch assembly 10. Switch assembly 10 includes a housing 146 that has opening 148 to mount (e.g., clamp) the switch assembly 10 to the arm segment 8 or, alternatively to the arm segment 9. The housing 146 has an interior space for housing a PCB. Similar to the probes 6 and 6b, the switch assembly 10 may include two switches, namely a take switch 131 and a confirm switch 132 that may be used by the operator to take a measurement (take switch 131) and to confirm the measurement (confirm switch 132) during operation. The position of the on-arm switch assembly 10, and more importantly of the switches 131 and 132, on the arm 2 instead of in the handles of the probe 6 allow for the operator to move and position the measurement probe 6 with one hand and to actuate the switches 131 and 132 with the other hand while supporting the arm. Prior art coordinate measurement machines required operators to position the measurement probe and actuate measurement switches in the probe with the same hand. This is not ergonomic. The on-arm switch assembly 10 is a significant advance in the coordinate measuring machine field because it provides a significantly more ergonomic solution as compared to prior art coordinate measurement machines.

The on-arm switch assembly 10 may also house a switch PCB 134 to which the switches 131 and 132 may mount or the on-arm switch assembly 10 may include a PCB that incorporates the functionality of both PCB 130 and switch PCB 134. In one embodiment, the PCB in the on-arm switch assembly 10 electrically connects to the communication bus of the CMM 1. In another embodiment, the PCB in the on-arm switch assembly 10 includes a wireless (e.g., Wi-Fi, Bluetooth, etc.) transmitter (instead of an electrical connection to the communication bus of the CMM 1) that wirelessly transmits take and confirm signals associated with the switches 131 and 132.

DEFINITIONS

The following includes definitions of selected terms employed herein. The definitions include various examples or forms of components that fall within the scope of a term and that may be used for implementation. The examples are not intended to be limiting. Both singular and plural forms of terms may be within the definitions.

As used herein, an "operable connection" or "operable coupling," or a connection by which entities are "operably connected" or "operably coupled" is one in which the entities are connected in such a way that the entities may perform as intended. An operable connection may be a direct connection or an indirect connection in which an intermediate entity or entities cooperate or otherwise are part of the connection or are in between the operably connected entities. In the context of signals, an "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

"Signal," as used herein, includes but is not limited to one or more electrical or optical signals, analog or digital signals, data, one or more computer or processor instructions, messages, a bit or bit stream, or other means that can be received, transmitted, or detected.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and so on, have been illustrated by describing examples, and while the examples have been described in considerable detail, it is not the intention of the applicants to restrict or in any way limit scope to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

What is claimed is:

1. A coordinate measurement machine (CMM) comprising:
   a manually-positionable articulated arm having first and second ends, the articulated arm including a plurality of arm segments and a plurality of rotary joints, the first end including a connector configured to connect to a measurement probe and the second end including a base for mounting the CMM to a mounting surface;
   wherein at least one of the rotary joints of the plurality of rotary joints includes a bearing assembly comprising:
      first and second bearings;
      a shaft that engages an inner race of the first bearing and an inner race of the second bearing, the shaft configured to rotate about an axis of rotation of the first bearing and the second bearing, the shaft fabricated from a first material having a first coefficient of thermal expansion;
      a housing that engages an outer race of the first bearing and an outer race of the second bearing, the housing fabricated from a second material having a second coefficient of thermal expansion different from the first coefficient of thermal expansion; and
      at least one transducer configured to output an angle signal corresponding to an angle of rotation of the shaft relative to the housing about the axis of rotation,
   wherein the inner race of the first bearing and the inner race of the second bearing engage the shaft and the outer race of the first bearing and the outer race of the second bearing engage the housing to produce a radial preload at a preload ambient temperature between 10° C. and 40° C. inclusive of 10° C. and 40° C., wherein temperatures of the first and second bearings, the shaft, and the housing change passively with ambient temperature, and wherein moment rigidity of the bearing assembly remains within 1% as the ambient temperature changes from 10° C. to 40° C. as a result of thermal expansion of at least one of the first and second bearings, the shaft, and the housing.

2. The CMM of claim 1, wherein the first coefficient of thermal expansion is lower than the second coefficient of thermal expansion.

3. The CMM of claim 1, wherein the first coefficient of thermal expansion is higher than the second coefficient of thermal expansion.

4. The CMM of claim 1, wherein
   the first coefficient of thermal expansion is in the range of from −2 to 2 μm/(m*°C) and the second coefficient of thermal expansion is in the range of from 21 to 24 μm/(m*°C),
   the first coefficient of thermal expansion in the range of from 9.5 to 17.5 μm/(m*°C) and the second coefficient of thermal expansion is in the range of from 21 to 24 μm(m*°C),
   the first coefficient of thermal expansion in the range of from 9.5 to 17.5 μm/(m*°C) and the second coefficient of thermal expansion is in the range of from 8 to 11 μm/(m*°C), or
   the first coefficient of thermal expansion in the range of from 21 to 24 μm/(m*°C) and the second coefficient of thermal expansion is in the range of from 8 to 11 μm (m*°C).

5. The CMM of claim 1, wherein the first material is carbon fiber and the second material is aluminum or aluminum alloy.

6. The CMM of claim 1, wherein the first material is invar and the second material is aluminum or aluminum alloy.

7. The CMM of claim 1, wherein the first material is titanium or titanium alloy and the second material is aluminum or aluminum alloy.

8. The CMM of claim 1, wherein radial rigidity of the bearing assembly remains within 10% as the ambient temperature changes from 10° C. to 40° C. as a result of the thermal expansion of the at least one of the first and second bearings, the shaft, and the housing.

9. A coordinate measurement machine (CMM) comprising:
a manually-positionable articulated arm having first and second ends, the articulated arm including a plurality of arm segments and a plurality of rotary joints, the first end including a connector configured to connect to a measurement probe and the second end including a base for mounting the CMM to a mounting surface;
wherein at least one of the rotary joints of the plurality of rotary joints includes a bearing assembly comprising:
first and second bearings;
a shaft that engages an inner race of the first bearing and an inner race of the second bearing, the shaft configured to rotate about an axis of rotation of the first bearing and the second bearing;
a housing that engages an outer race of the first bearing and an outer race of the second bearing; and
at least one transducer configured to output an angle signal corresponding to an angle of rotation of the shaft relative to the housing about the axis of rotation;
wherein the shaft is fabricated from a first material having a first coefficient of thermal expansion and the housing is fabricated from a second material having a second coefficient of thermal expansion different from the first coefficient of thermal expansion such that radial rigidity of the bearing assembly remains within 10% as ambient temperature of the CMM changes from 10° C. to 40° C.

10. The CMM of claim 9, wherein
the first coefficient of thermal expansion is in the range of from −2 to 2 μm/(m*C) and the second coefficient of thermal expansion is in the range of from 21 to 24 μm/(m*C),
the first coefficient of thermal expansion in the range of from 9.5 to 17.5 μ/(m*C) and the second coefficient of thermal expansion is in the range of from 21 to 24 μm/(m*C),
the first coefficient of thermal expansion in the range of from 9.5 to 17.5 μm/(m*C) and the second coefficient of thermal expansion is in the range of from 8 to 11 μm/(m*C), or
the first coefficient of thermal expansion in the range of from 21 to 24 μm/(m*C) and the second coefficient of thermal expansion is in the range of from 8 to 11 μm/(m*C).

11. The CMM of claim 9, wherein
the first material is carbon fiber and the second material is aluminum or aluminum alloy,
the first material is invar and the second material is aluminum or aluminum alloy, or
the first material is aluminum or aluminum alloy and the second material is titanium or titanium alloy.

12. The CMM of claim 9, wherein the outer race of the first bearing and the outer race of the second bearing are engaged to the housing and the inner race of the first bearing and the inner race of the second bearing are engaged to the shaft to produce a predetermined radial preload at a preload temperature between 10° C. and 40° C. inclusive of 10° C. and 40° C., wherein temperatures of the first and second bearings, the shaft, and the housing change passively with ambient temperature and moment rigidity of the bearing assembly remains within 1% as the ambient temperature changes from 10° C. to 40° C.

13. A coordinate measurement machine (CMM) comprising:
a manually-positionable articulated arm having first and second ends, the articulated arm including a plurality of arm segments and a plurality of rotary joints, the first end including a connector configured to connect to a measurement probe and the second end including a base for mounting the CMM to a mounting surface;
wherein at least one of the rotary joints of the plurality of rotary joints includes a bearing assembly comprising:
first and second bearings;
a shaft that engages an inner race of the first bearing and an inner race of the second bearing, the shaft configured to rotate about an axis of rotation of the first bearing and the second bearing, the shaft fabricated from a first material having a first coefficient of thermal expansion;
a housing that engages an outer race of the first bearing and an outer race of the second bearing, the housing fabricated from a second material having a second coefficient of thermal expansion different from the first coefficient of thermal expansion; and
at least one transducer configured to output an angle signal corresponding to an angle of rotation of the shaft relative to the housing about the axis of rotation,
wherein temperatures of the first and second bearings, the shaft, and the housing change passively with ambient temperature, and
wherein
the first material is carbon fiber and the second material is aluminum or aluminum alloy,
the first material is invar and the second material is aluminum or aluminum alloy, or
the first material is aluminum or aluminum alloy and the second material is titanium or titanium alloy.

14. The CMM of claim 13, wherein the inner race of the first bearing and the inner race of the second bearing engage the shaft and the outer race of the first bearing and the outer race of the second bearing engage the housing to produce a radial preload at a preload ambient temperature between 10° C. and 40° C. inclusive of 10° C. and 40° C., and wherein moment rigidity of the bearing assembly remains within 1% as the ambient temperature changes from 10° C. to 40° C. as a result of thermal expansion of at least one of the first and second bearings, the shaft, and the housing.

15. The CMM of claim 13, wherein the inner race of the first bearing and the inner race of the second bearing engage the shaft and the outer race of the first bearing and the outer race of the second bearing engage the housing to produce a radial preload at a preload ambient temperature between 10° C. and 40° C. inclusive of 10° C. and 40° C., and wherein radial rigidity of the bearing assembly remains within 10% as the ambient temperature changes from 10° C. to 40° C. as a result of thermal expansion of at least one of the first and second bearings, the shaft, and the housing.

16. A coordinate measurement machine (CMM) comprising:
a manually-positionable articulated arm having first and second ends, the articulated arm including a plurality of arm segments and a plurality of rotary joints, the first end including a connector configured to connect to a measurement probe and the second end including a base for mounting the CMM to a mounting surface;
wherein at least one of the rotary joints of the plurality of rotary joints includes a bearing assembly comprising:
first and second bearings;
a shaft that engages an inner race of the first bearing and an inner race of the second bearing, the shaft configured to rotate about an axis of rotation of the first bearing and the second bearing, the shaft fabricated from a first material having a first coefficient of thermal expansion;
a housing that engages an outer race of the first bearing and an outer race of the second bearing, the housing fabricated from a second material having a second coefficient of thermal expansion different from the first coefficient of thermal expansion; and
at least one transducer configured to output an angle signal corresponding to an angle of rotation of the shaft relative to the housing about the axis of rotation,
wherein temperatures of the first and second bearings, the shaft, and the housing change passively with ambient temperature, and
wherein
at least one of the first and second bearings is a ceramic bearing in which the bearing balls and the inner and outer race are manufactured of one or more of silicon nitride, alumina oxide, zirconia oxide, and silicon carbide.

17. The CMM of claim 16, wherein the inner race of the first bearing and the inner race of the second bearing engage the shaft and the outer race of the first bearing and the outer race of the second bearing engage the housing to produce a radial preload at a preload ambient temperature between 10° C. and 40° C. inclusive of 10° C. and 40° C., and wherein moment rigidity of the bearing assembly remains within 1% as the ambient temperature changes from 10° C. to 40° C.

18. The CMM of claim 16, wherein the inner race of the first bearing and the inner race of the second bearing engage the shaft and the outer race of the first bearing and the outer race of the second bearing engage the housing to produce a radial preload at a preload ambient temperature between 10° C. and 40° C. inclusive of 10° C. and 40° C., and wherein radial rigidity of the bearing assembly remains within 10% as the ambient temperature changes from 10° C. to 40° C.

19. A coordinate measurement machine (CMM) comprising:
a manually-positionable articulated arm having first and second ends, the articulated arm including a plurality of arm segments and a plurality of rotary joints, the first end including a connector configured to connect to a measurement probe and the second end including a base for mounting the CMM to a mounting surface;
wherein at least one of the rotary joints of the plurality of rotary joints includes a bearing assembly comprising:
first and second bearings;
a shaft that engages an inner race of the first bearing and an inner race of the second bearing, the shaft configured to rotate about an axis of rotation of the first bearing and the second bearing, the shaft fabricated from a first material having a first coefficient of thermal expansion;
a housing that engages an outer race of the first bearing and an outer race of the second bearing, the housing fabricated from a second material having a second coefficient of thermal expansion different from the first coefficient of thermal expansion; and
at least one transducer configured to output an angle signal corresponding to an angle of rotation of the shaft relative to the housing about the axis of rotation,
wherein temperatures of the first and second bearings, the shaft, and the housing change passively with ambient temperature, and
wherein
at least one of the first and second bearings is a ceramic bearing in which the bearing balls and the inner and outer race are manufactured of one or more of silicon nitride, alumina oxide, zirconia oxide, and silicon carbide, and
a) the first material is carbon fiber and the second material is carbon fiber,
b) the first material is invar and the second material is invar,
c) the first material is carbon fiber and the second material is invar, or
d) the first material is invar and the second material is carbon fiber.

20. The CMM of claim 19, wherein
the inner race of the first bearing and the inner race of the second bearing engage the shaft and the outer race of the first bearing and the outer race of the second bearing engage the housing to produce a radial preload at a preload ambient temperature between 10° C. and 40° C. inclusive of 10° C. and 40° C., and wherein moment rigidity of the bearing assembly remains within 1% as the ambient temperature changes from 10° C. to 40° C., or
the inner race of the first bearing and the inner race of the second bearing engage the shaft and the outer race of the first bearing and the outer race of the second bearing engage the housing to produce a radial preload at a preload ambient temperature between 10° C. and 40° C. inclusive of 10° C. and 40° C., and wherein radial rigidity of the bearing assembly remains within 10% as the ambient temperature changes from 10° C. to 40° C.

* * * * *